US010498247B2

United States Patent
Murakami

(10) Patent No.: US 10,498,247 B2
(45) Date of Patent: Dec. 3, 2019

(54) DC-DC CONVERTER

(71) Applicant: SHARP KABUSHIKI KAISHA, Sakai, Osaka (JP)

(72) Inventor: Kohzaburoh Murakami, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/219,118

(22) Filed: Dec. 13, 2018

(65) Prior Publication Data

US 2019/0190393 A1    Jun. 20, 2019

(30) Foreign Application Priority Data

Dec. 14, 2017   (JP) .................................. 2017-239801

(51) Int. Cl.
*H02M 3/335* (2006.01)
*H02M 1/00* (2006.01)
*H02M 3/158* (2006.01)

(52) U.S. Cl.
CPC ...... *H02M 3/33584* (2013.01); *H02M 3/1584* (2013.01); *H02M 3/33553* (2013.01); *H02M 2001/0003* (2013.01); *H02M 2001/0048* (2013.01)

(58) Field of Classification Search
CPC ......... H02M 3/33553; H02M 3/33584; H02M 3/1584; H02M 2001/0048; H02M 2001/0003; H02M 3/33561
See application file for complete search history.

(56) References Cited

U.S. PATENT DOCUMENTS

| 8,208,274 | B2* | 6/2012 | Raju ................. H02M 3/33561 363/132 |
| 8,891,254 | B2* | 11/2014 | Kominami ............. H02M 1/32 363/17 |
| 9,806,625 | B2* | 10/2017 | Takahara ............ H02M 1/4258 |
| 2008/0094859 | A1* | 4/2008 | Takayanagi ............ H02M 1/10 363/17 |
| 2009/0290385 | A1* | 11/2009 | Jungreis .............. H02M 1/4241 363/17 |
| 2010/0142240 | A1* | 6/2010 | Lee ..................... H02M 3/3378 363/132 |

(Continued)

FOREIGN PATENT DOCUMENTS

JP         2014-087134 A       5/2014

OTHER PUBLICATIONS

K. Hirachi. "DAB DC-DC converter", Hirachi Laboratory Technical Memorandum No. 20140310, National Institute of Technology, Maizuru College, Japan, Mar. 10, 2014. (A concise explanation of the relevance can be found in paragraphs [0003]-[0005], and [0007] of the specification of the subject application).

*Primary Examiner* — Kyle J Moody
(74) *Attorney, Agent, or Firm* — ScienBiziP, P.C.

(57) ABSTRACT

A direct current to direct current (DC-DC) converter includes a k-th order converter including a reactor, multiple semiconductor switching elements, and multiple capacitors respectively connected in parallel with the semiconductor switching elements (k is a natural number equal to or below N and N is a natural number equal to or above 3), a transformer having a primary winding through an N-th order winding, and a controller that controls switching of a primary converter through an N-th order converter.

11 Claims, 16 Drawing Sheets

(56) References Cited

U.S. PATENT DOCUMENTS

| | | | |
|---|---|---|---|
| 2014/0334189 A1* | 11/2014 | Yan .................. | H02M 3/33584 363/17 |
| 2015/0180356 A1* | 6/2015 | Norisada ........... | H02M 3/33546 363/17 |
| 2015/0349649 A1* | 12/2015 | Zane ................. | H02M 3/33507 363/21.03 |

* cited by examiner

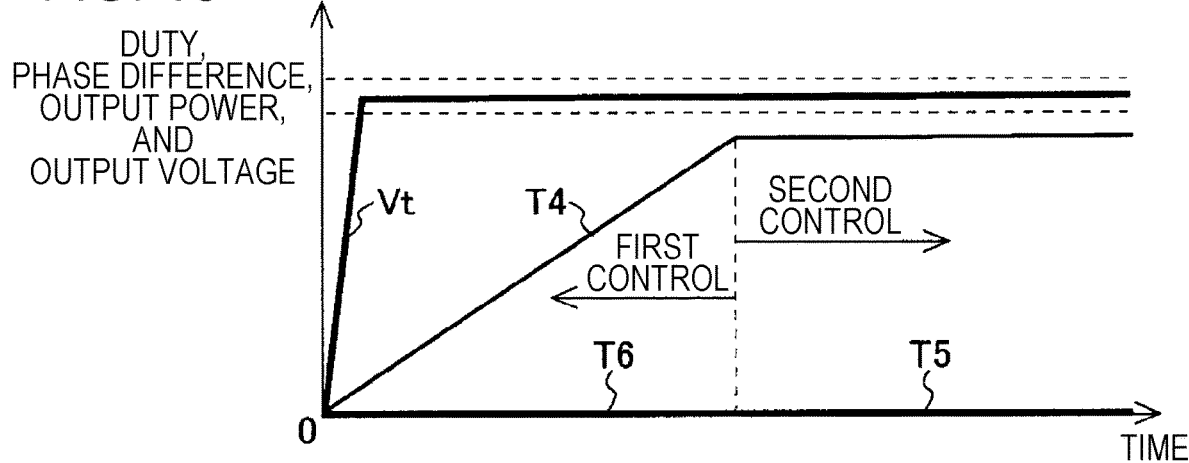
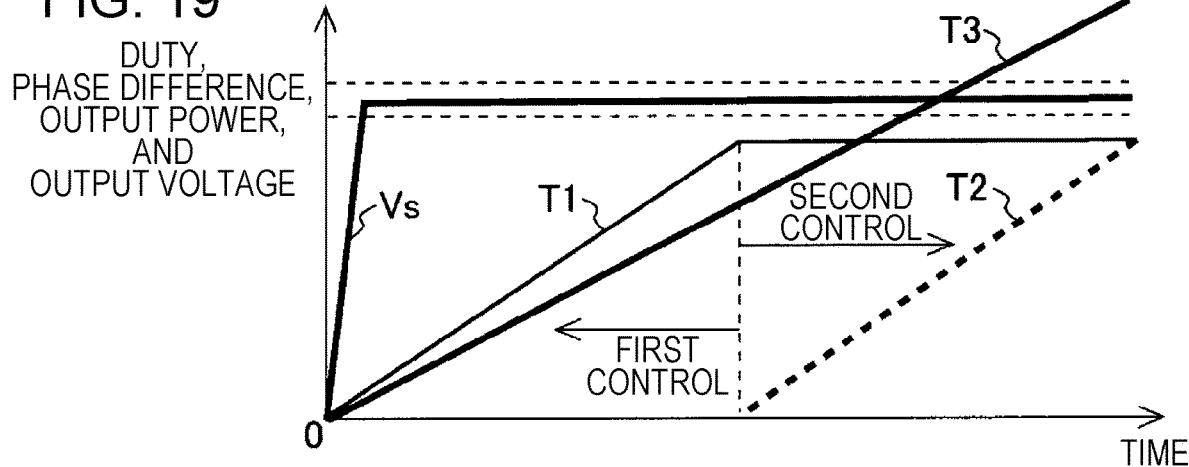
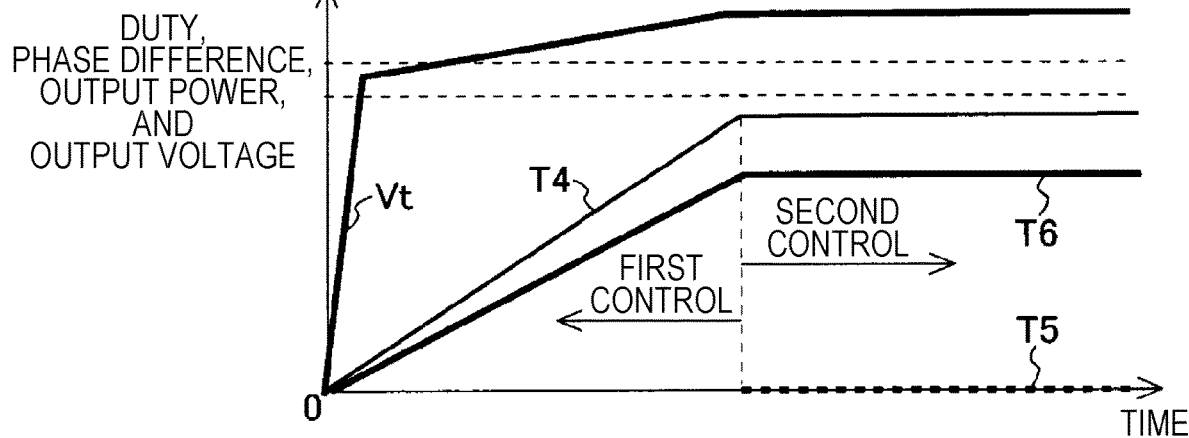

DC-DC CONVERTER

BACKGROUND

1. Field

The present disclosure relates to a direct current to direct current (DC-DC) converter.

2. Description of the Related Art

Dual active bridge (DAB) DC-DC converters are disclosed in Japanese Unexamined Patent Application Publication No. 2014-87134 and K. Hirachi "DAB DC-DC converter" Hirachi Laboratory Technical Memorandum No. 20140310, National Institute of Technology, Maizuru College, Japan, Mar. 10, 2014.

The DAB DC-DC converter disclosed in Hirachi Laboratory Technical Memorandum No. 20140310 includes a primary full bridge circuit and a secondary full bridge circuit linked via an insulation transformer. In each of the primary full bridge circuit and the secondary full bridge circuit, a switching element located in one diagonal angle and a switching element and a switching element located in the other diagonal angle are complementarily turned on with a duty factor of 50% of a fixed period except for dead time. Power transferred is adjusted using as an operation amount a phase difference between switching of the primary full bridge circuit and switching of the secondary full bridge circuit.

If the phase difference between the switching of the primary full bridge circuit and the switching of the secondary full bridge circuit in the DAB DC-DC converter disclosed in Hirachi Laboratory Technical Memorandum No. 20140310 is set to be zero, a circulating current Inp flowing through a primary winding of the insulation transformer and a circulating current Ins flowing through a secondary winding result as illustrated in FIG. 21. In the DAB DC-DC converter disclosed in Hirachi Laboratory Technical Memorandum No. 20140310 as illustrated in FIG. 21, the circulating current Inp of an amplitude less than 2 A and the circulating current Ins of an amplitude less than 2 A flow with no power transferred from the primary winding to the secondary winding.

A DC-DC converter with a tertiary winding added to an insulation transformer in the DAB DC-DC converter disclosed in Hirachi Laboratory Technical Memorandum No. 20140310 and a tertiary full bridge circuit added to the DAB DC-DC converter is now studied (hereinafter referred to as a three-directional DC-DC converter).

The phase difference between the switching of the primary full bridge circuit and the switching of the secondary full bridge circuit in the three-directional DC-DC converter may be increased such that power is transferred from the primary side to the secondary side, and the phase difference between the switching of the primary full bridge circuit and the switching of the tertiary full bridge circuit in the three-directional DC-DC converter may be controlled such that no power is transferred from the primary side to the tertiary side. In such a case, the current Inp flowing through the primary winding of the insulation transformer, the current Ins flowing through the secondary winding of the insulation transformer, and a circulating current Int flowing through the tertiary winding of the insulation transformer result as illustrated in FIG. 22. FIG. 22 indicates that the circulating current Int reaches about an amplitude of 30 A with no power transferred from the primary side to the tertiary side. A high circulating current that does not contribute to power transfer leads to an increase in power loss.

In the DAB DC-DC converter disclosed in Hirachi Laboratory Technical Memorandum No. 20140310 as illustrated in FIG. 23, the input side and the output side are uniquely determined depending on whether the phase difference between the switching of the primary full bridge circuit and the switching of the secondary full bridge circuit is positive or negative. On the other hand, if the phase difference between the primary full bridge circuit, the secondary full bridge circuit, and the tertiary bridge circuit in the three-directional DC-DC converter is related as in FIG. 24, the secondary full bridge circuit becomes an output side with respect to the primary full bridge circuit, and becomes an input side with respect to the tertiary bridge circuit. More specifically, the secondary full bridge circuit becomes unfixed, namely, could be an input side or an output side. The secondary full bridge circuit receives power from the primary full bridge circuit, and transfers power to the tertiary bridge circuit. This operation increases the circulating current.

It is desirable to provide a DC-DC converter that include a primary converter through N-th order converter (N is a natural number equal to or above 3) and reduces power loss caused by the circulating current.

SUMMARY

According to an aspect of the disclosure, there is provided a direct current to direct current (DC-DC) converter. The DC-DC converter includes a k-th order converter including a reactor, multiple semiconductor switching elements, and multiple capacitors respectively connected to the semiconductor switching elements (k is a natural number equal to or below N and N is a natural number equal to or below), a transformer having a primary winding through an N-th order winding, and a controller that controls switching of a primary converter through an N-th order converter. The reactor of the k-th order converter is the reactor connected to the k-th order winding and/or a leakage inductance of the k-th order winding. Each of the primary converter through the N-th order converter includes a full bridge circuit. When the controller performs first control with each of the primary converter through the N-th order converter set to be an input converter or an output converter, the controller controls a switching operation such that the semiconductor switching element located in an upper side of a first arm of the input converter matches the semiconductor switching element located in an lower side of a second arm of the input converter in terms of an on period, controls a switching operation such that the semiconductor switching element located in a lower side of the first arm of the input converter matches the semiconductor switching element located in an upper side of the second arm of the input converter in terms of the on period, does not control a switching operation on two semiconductor switching elements located in the upper sides or the lower sides of the first arm and the second arm of the output converter, controls a switching operation with a phase difference of about 180 degrees on other two secondary semiconductor switching elements on a secondary side located in the upper sides or the lower sides of the first arch and the second arm of the output converter, controls a switching operation such that one of the other two secondary semiconductor switching elements on the secondary side located in the upper sides or the lower sides of the first arm and the second arm matches each of the semiconductor switching element located in the upper side of the first arm of the input converter and the semiconductor switching element located in the lower side of the second arm of the Input converter in terms of the on period, and adjusts output power of the output converter by varying an on duty of each of the switching operations.

BRIEF DESCRIPTION OF THE DRAWINGS

FIG. 18 is a timing diagram illustrating tertiary output power in the constant voltage control;

FIG. 19 is a timing diagram illustrating the secondary output power in the constant voltage control;

FIG. 20 is a timing diagram illustrating the tertiary output power in the constant voltage control.

DESCRIPTION OF THE EMBODIMENTS

Embodiment of the disclosure is described below in connection with the drawings.

1. Configuration of DC-DC Converter

Figure 1:
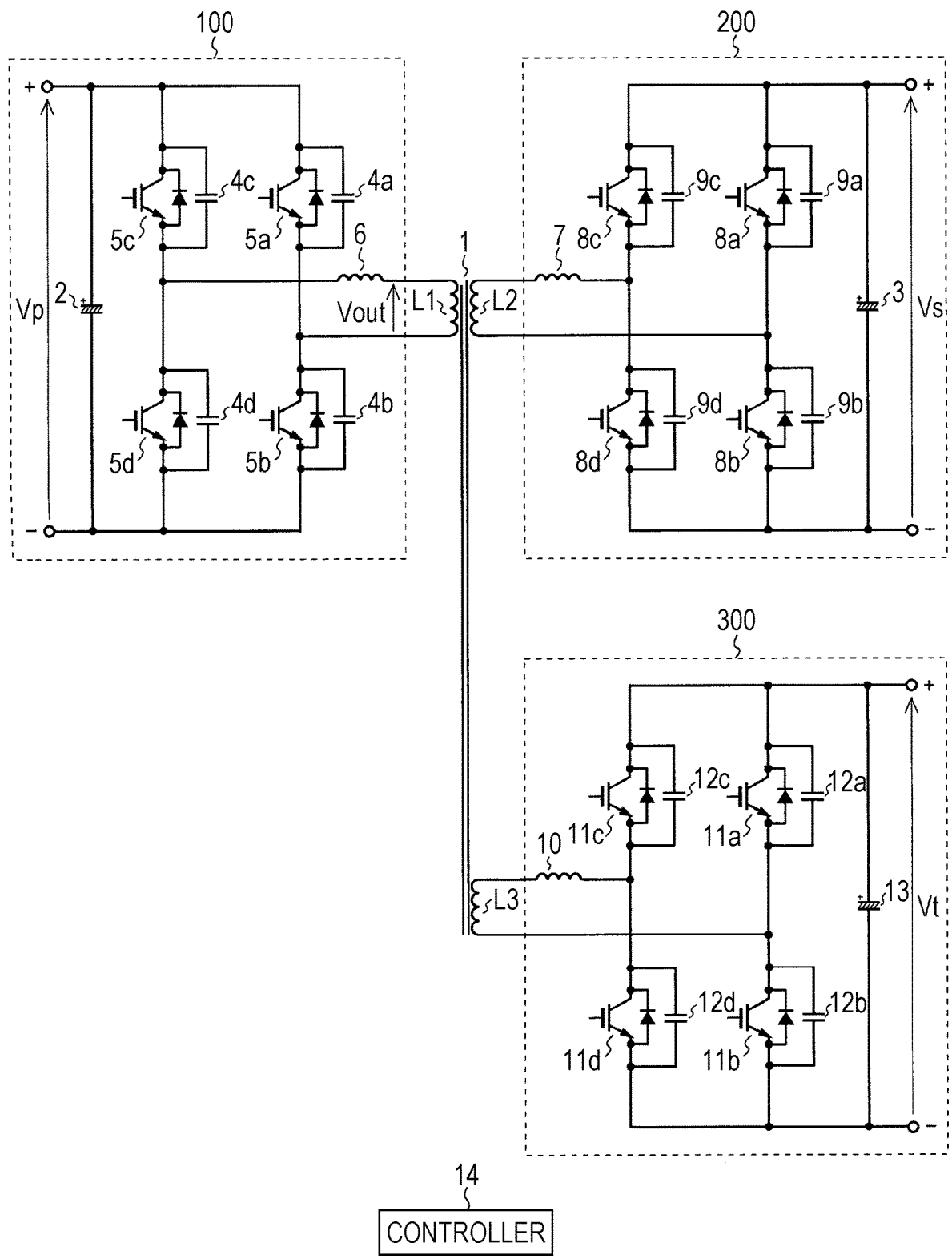
FIG. 1 is a schematic view of a DC-DC converter of an embodiment of the disclosure.

FIG. 1 is a schematic view of a DC-DC converter of the embodiment of the disclosure. The DC-DC converter of the embodiment of the disclosure includes the transformer 1, a primary converter 100, a secondary converter 200, a tertiary converter 300, and a controller 14. The primary converter 100 is connected to a primary winding L1 of the transformer 1, the secondary converter 200 is connected to a secondary winding L2 of the transformer 1, and the tertiary converter 300 is connected to a tertiary winding L3 of the transformer 1. In the discussion that follows, the winding ratio of the primary winding L1, the secondary winding L2 and the tertiary winding L3 is 1:1:1. The winding ratio is not limited to 1:1:1, and any winding ratio is acceptable.

The primary converter 100 includes capacitors 2, and 4a through 4d, insulated gate bipolar transistors (IGBTs) 5a through 5d, and a reactor 6. Diodes are connected in inverse direction respectively in parallel with the IGBTs 5a through 5d. The capacitors 4a through 4d are connected respectively in parallel with the IGBTs 5a through 5d. The IGBT 5a is connected in series with the IGBT 5b, the collector of the IGBT 5a is connected to the positive end of the capacitor and the emitter of the IGBT 5b is connected to the negative end of the capacitor 2. Similarly, the IGBT 5c is connected in series with the IGBT 5d. The collector of the IGBT 5c is connected to the positive end of the capacitor 2 and the emitter of the IGBT 5d is connected to the negative end of the capacitor 2. The connection node of the IGBT 5c and the IGBT 5d is connected to one end of the primary winding L1 via the reactor 6, and the connection node of the IGBT 5a and the IGBT 5b is connected to the other end of the primary winding L1. The reactor 6 may a coil, a leakage inductance of the primary winding L1, or both the coil and the leakage inductance of the primary winding L1.

The secondary converter 200 includes capacitors 3, and 9a through 9d, IGBTs 8a through 8d, and a reactor 7. Diodes are connected in inverse direction respectively in parallel with the IGBTs 8a through 8d. The capacitors 9a through 9d are connected respectively in parallel with the IGBTs 8a through 8d. The IGBT 8a is connected in series with the IGBT 8b, the collector of the IGBT 8a is connected to the positive end of the capacitor 3, and the emitter of the IGBT 8b is connected to the negative end of the capacitor 3. Similarly, the IGBT 8c is connected in series with the IGBT 8d. The collector of the IGBT 8c is connected to the positive end of the capacitor 3 and the emitter or the IGBT 8d is connected to the negative end of the capacitor 3. The connection node of the IGBT 8c and the IGBT 8d is connected to one end of the secondary winding L2 via the reactor 7, and the connection node of the IGBT 8a and the IGBT 8b is connected to the other end of the secondary winding L2. The reactor 7 may a coil, a leakage inductance of the secondary winding L2, or both the coil and the leakage inductance of the secondary winding L2.

The tertiary converter 300 includes capacitors 13, and 12a through 12d, IGBTs 11a through 11d, and a reactor 10. Diodes are connected in inverse direction respectively in parallel with the IGBTs 11a through 11d. The capacitors 12a through 12d are connected respectively in parallel with the IGBTs 11a through 11d. The IGBT 11a is connected in series with the IGBT 11b, the collector of the IGBT 11a is connected to the positive end of the capacitor 13, and the emitter of the IGBT 11*b* is connected to the negative end of the capacitor 13. Similarly, the IGBT 11*c* is connected in series with the IGBT 11*d*. The collector of the IGBT 11*c* is connected to the positive end of the capacitor 13 and the emitter of the IGBT 11*d* is connected to the negative end of the capacitor 13. The connection node of the IGBT 11*c* and the IGBT 11*d* is connected to one end of the tertiary winding L3 via the reactor 10, and the connection node of the IGBT 11*a* and the IGBT 11*b* is connected to the other end of the tertiary winding L3. The reactor 10 may a coil, a leakage inductance of the tertiary winding L3, or both the coil and the leakage inductance of the tertiary winding L3.

The controller 14 applies a gate signal to each of the IGBTs 5*a* through 5*d*, 8*a* through 8*d*, and 11*a* through 11*d*, thereby controlling each of the IGBTs 5*a* through 5*d*, 8*a* through 8*d*, and 11*a* through 11*d*.

The controller 14 sets each of the primary converter 100, the secondary converter 200, and the tertiary converter 300 to be either an input converter or an output converter. If all the output converters are adjustable in output power thereof in the first control, the first control is performed. If one of the output converters becomes difficult to adjust in the output power thereof in the first control, that output converter difficult to adjust in the output power thereof is then controlled in the second control.

In this way, all the output converters adjustable in the output power thereof in the first control are controlled in the first control, and when one of the output converters becomes difficult to adjust in the output power thereof in the first control, that output converter is then controlled in the second control. The controller 14 desirably switches from the first control to the second control. If the state that one of the output converter unadjustable in the output power thereof in the first control is controlled in the second control transitions to the state that all the output converters become adjustable in the first control, the controller 14 desirably directly switches from the second control to the first control to perform the first control on that output converter that is controlled earlier in the second control.

The first control and the second control are described below.

2. First Control

The operation of the first control is described with reference to the circuit configuration of a primary side and a secondary side serving as a minimum unit of power transfer, namely, the circuit configuration of FIG. 1 without a tertiary side, and the discussion is then extended to the circuit configuration of the primary to tertiary side, namely, the circuit configuration of FIG. 1.

2.1 First Control of Circuit Configuration of Primary and Secondary Sides

The controller 14 performs a switching operation on the IGBTs 5*a* through 5*d*, 8*b*, and 8*d*, turning the IGBTs 8*a* and 8*c* off, and changing an on duty of the IGBTs 5*a* through 5*d*, 8*b*, and 8*d*. The controller 14 thus adjusts the power output from the secondary converter 200.

Figure 2:
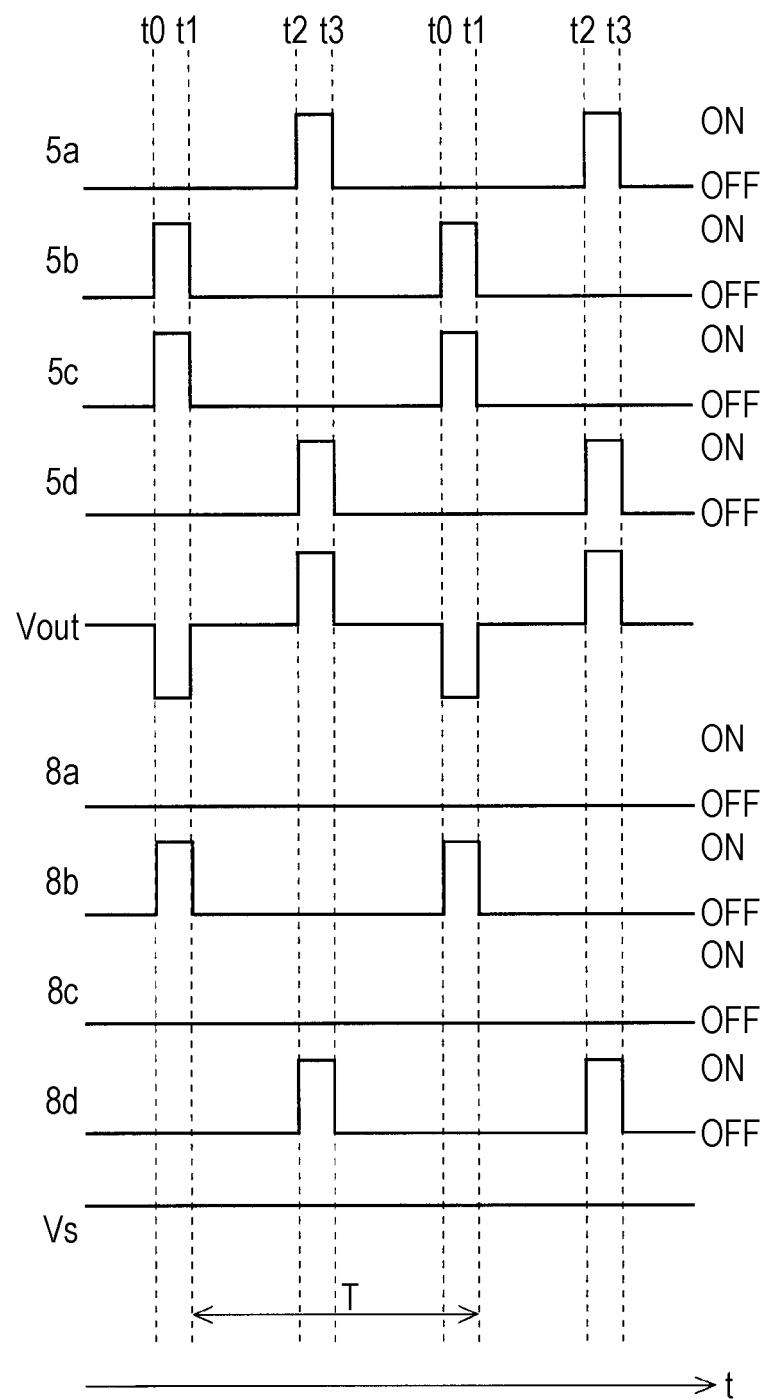
FIG. 2 is a timing diagram of first control illustrating states of insulated gate bipolar transistors (IGBTs) and output waveforms of primary and secondary converters.

FIG. 2 is a timing diagram of the first control illustrating states of the IGBTs and an waveform of the output voltage of Vout of the primary converter 100, and a waveform of the output voltage Vs of the secondary converter 200. IGBTs 5*b*, 5*c*, and 8*b* are switched in synchronization with a period T, and IGBTs 5*a*, 5*d*, and 8*d* are switched with half the period T shifted (by a phase shift of 180 degrees) from the IGBTs 5*b*, 5*c*, and 8*b*.

Figure 3:
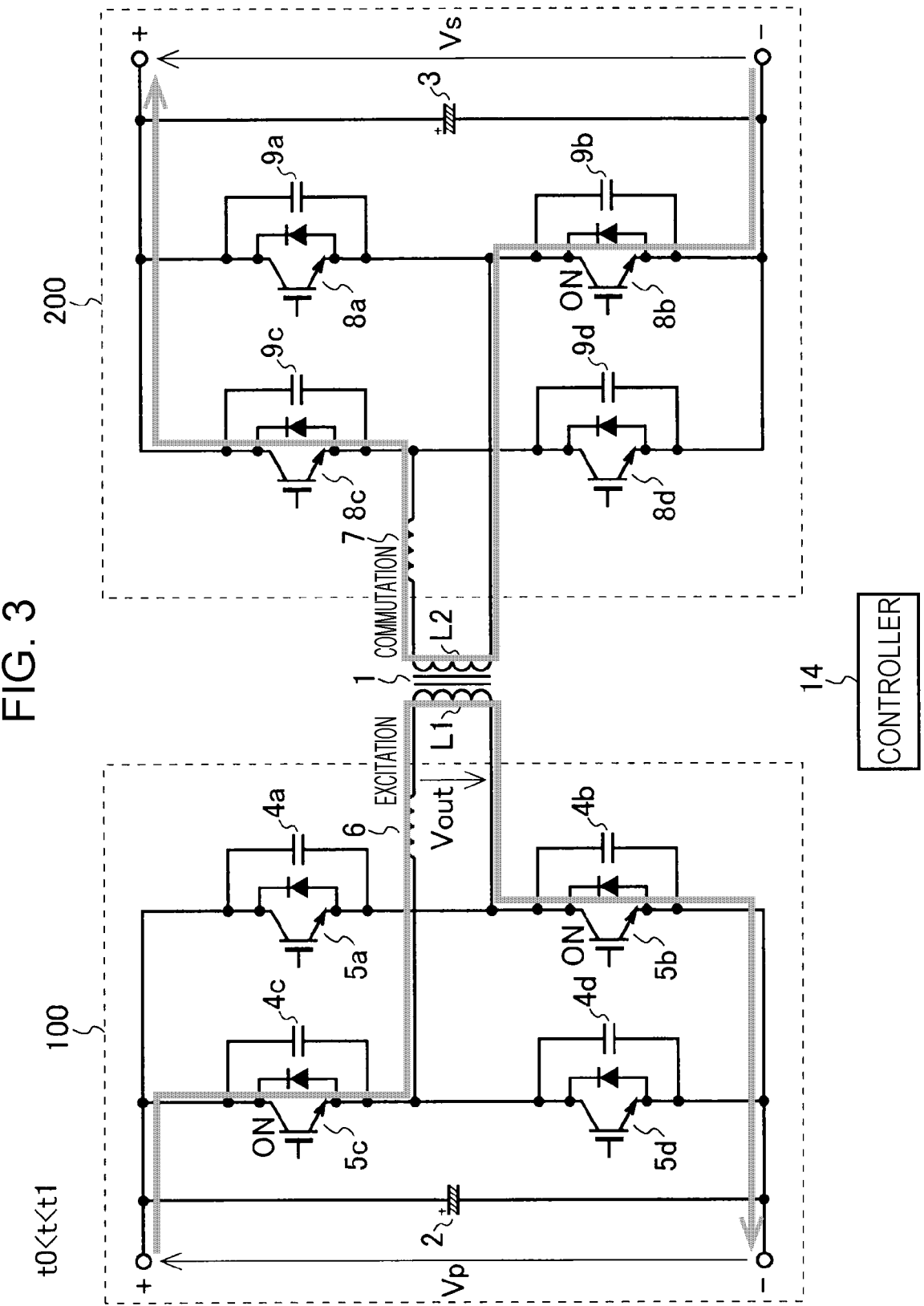
FIG. 3 illustrates an operation of the DC-DC converter in the first control.

Since IGBTs 5*b* and 5*c* are in an on state at time t within a range of t0<t<t1 as illustrated in FIG. 2, a current flows through the IGBT 5*c*, the reactor 6, the primary winding L1 and the IGBT 5*b* in that order in the primary converter 100 as illustrated in FIG. 3. In this way, an electromotive force occurs in the secondary winding L2 of the transformer 1, and a current flows through the IGBT 8*b*, the secondary winding L2 of the transformer 1, the reactor 7, and the IGBT 8*c* in that order in the secondary converter 200 as illustrated in FIG. 3.

Figure 4:
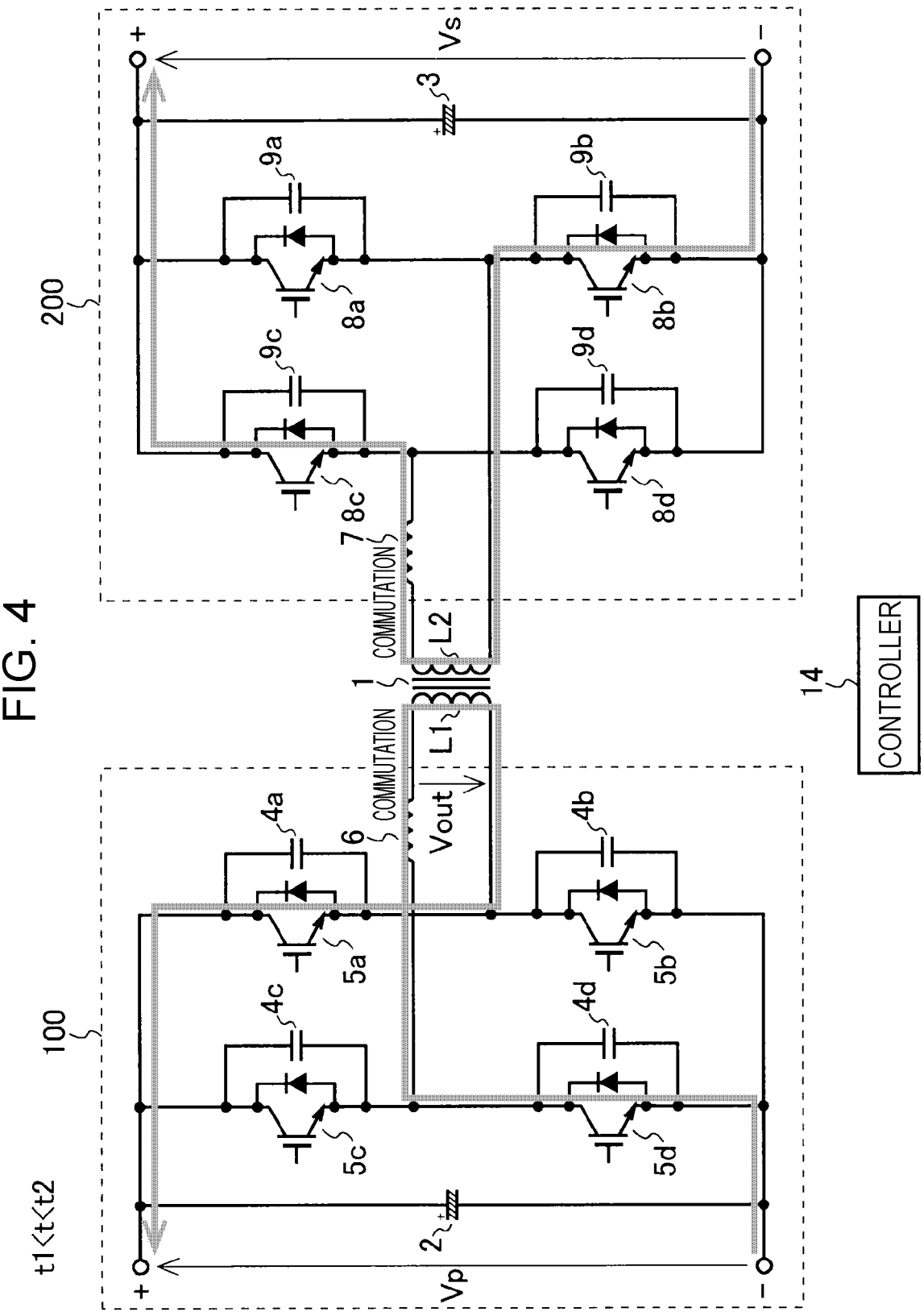
FIG. 4 illustrates the operation of the DC-DC converter in the first control.
Figure 5:
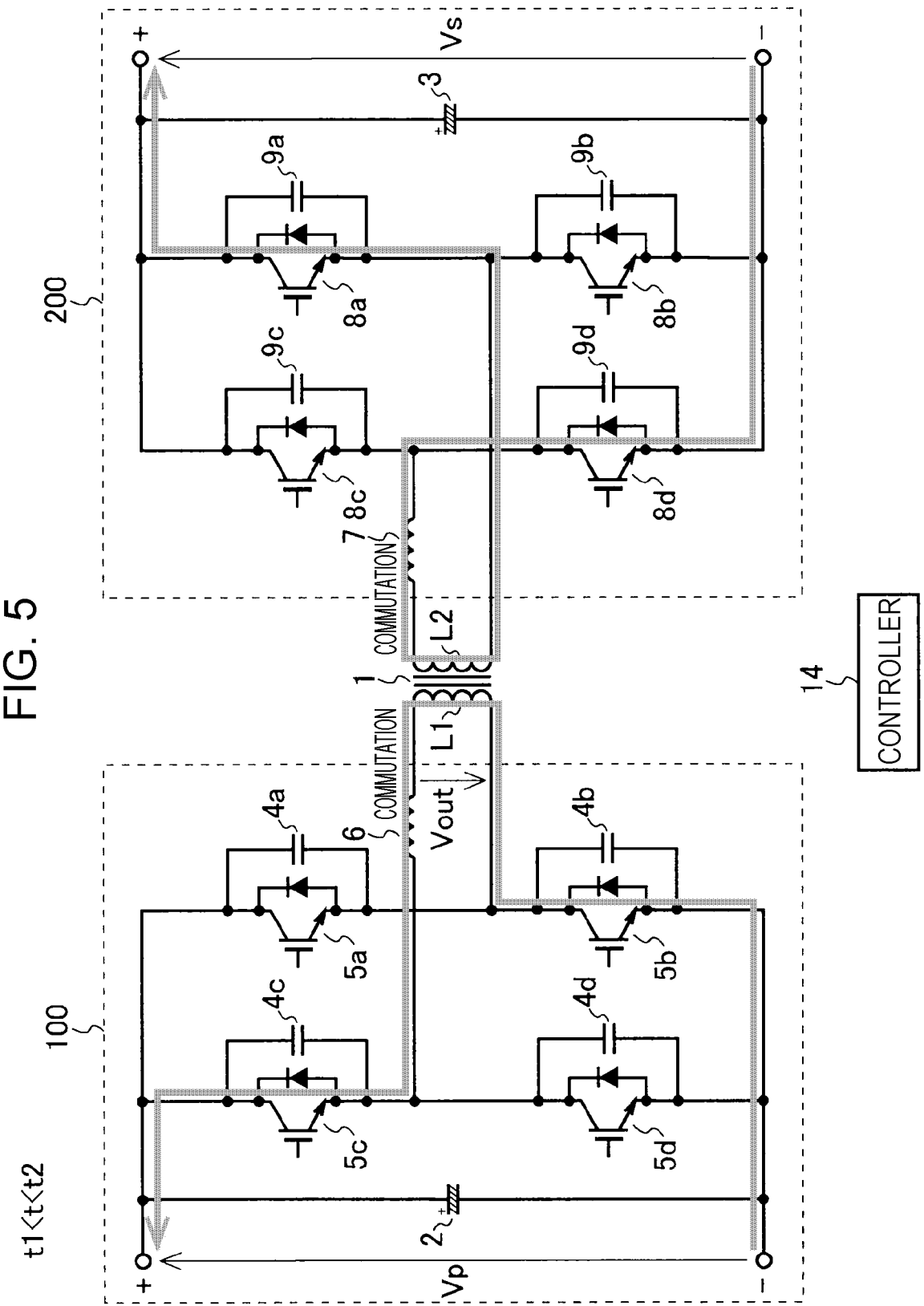
FIG. 5 illustrates the operation of the DC-DC converter in the first control.

At time t within a range of t1<t<t2, all the IGBTs 5*a* through 5*d* and 8*a* through 8*d* are in an off state as illustrated in FIG. 2. Electromotive forces occur in the reactors 6 and 7 in a direction that maintains the currents, causing electrical oscillations (alternating between the state of FIG. 4 and the state of FIG. 5). Excitation energy stored in the reactor 6 is re-generated across the input terminals in the primary converter 100, and excitation energy stored in the reactor 7 is supplied to output terminals in the secondary converter 200. The regeneration operation in the primary converter 100 continues until the excitation energy in the reactor 6 becomes zero, and the regeneration operation in the secondary converter 200 continues until the excitation energy in the reactor 7 becomes zero.

When the reactors 6 and 7 stop electrically oscillating with the excitation energy thereof being zero at timing t=t2, a voltage Vp/2 is applied across the collector—emitter of each of the IGBTs 5*a* through 5*d*, and a voltage Vs/2 is applied across the collector—emitter of each of The IGBTs 8*a* through 8*d*. If the IGBT 5*a*, 5*d*, and 8*d* are turned on as illustrated in FIG. 2 in that state, charges 4*a*, 4*d*, and 9*d* stored in capacitors respectively connected in parallel with the IGBT 5*a*, 5*d*, and 8*d* are consumed via short-circuiting.

If the excitation energy in at least one of the reactors 6 and 7 is not zero at timing t=t2, a voltage V falling within a range of $0 \leq V \leq Vp$ is applied across the collector—emitter of each of the IGBTs 5*a* through 5*d*, and a voltage V falling within a range of $0 \leq V \leq Vs$ is applied across the collector—emitter of each of the IGBTs 8*a* through 8*d*.

Since the full bridges are symmetrical in structure, the operation of the primary converter 100 and the secondary converter 200 at time t within a range of t2<t<t3 is identical to the operation of the primary converter 100 and the secondary converter 200 at time t within a range of t0<t<t1 though a different combination of IGBTs is turned on.

2.2 First Control of Circuit Configuration of FIG. 1

In the circuit configuration described below, the controller 14 sets the primary converter 100 to be an input converter, and sets the secondary converter 200 and the tertiary converter 300 to be output converters with a load connected to the secondary side only. More specifically, power is output from the secondary side to the load, and no power is output from the tertiary side.

The controller 14 performs a switching operation on the IGBTs 5*a* through 5*d*, 8*b*, 8*d*, 11*b*, and 11*d*, thereby turning the IGBTs 8*a*, 8*c*, 11*a*, and 11*c* off, and changing the on duty of each of the IGBTs 5*a* through 5*d*, 8*b*, 8*d*, 11*b*, and 11*d*. The controller 14 thus adjusts the output voltage Vs output from the secondary converter 200 and the output power Vt output from the tertiary converter 300.

Figure 6:
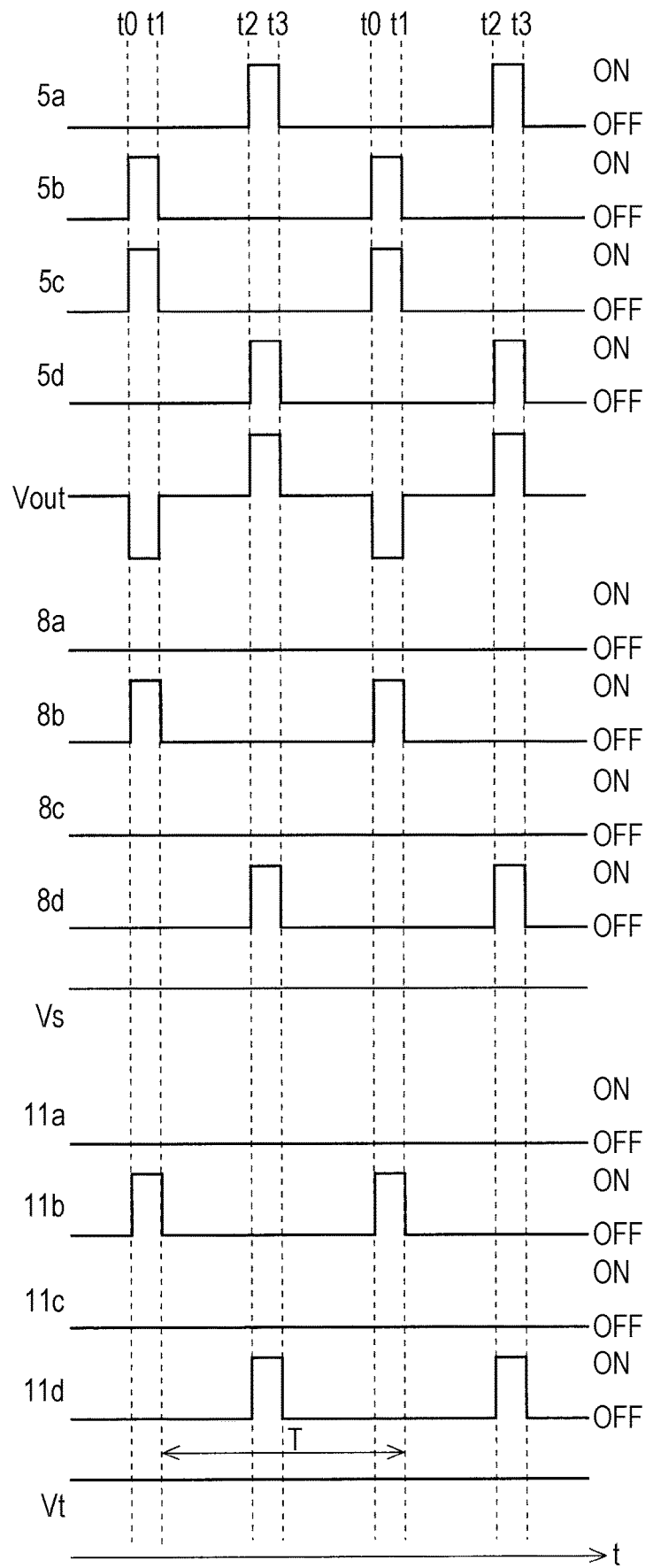
FIG. 6 is a timing diagram of the first control illustrating states of the IGBTs and output waveforms of the primary to tertiary converters.

FIG. 6 is a timing diagram illustrating the states of the IGBTs and the waveform of the output voltage Vout of the primary converter 100, the waveform of the output voltage Vs of the secondary converter 200, and a waveform of the output voltage Vt of the tertiary converter 300. IGBTs 5*b*, 5*c*, 8*b*, and 11*b* are switched in synchronization with a period T and IGBTs 5*a*, 5*d*, 8*d*, and 11*d* are switched half the period in phase off IGBTs 5*b*, 5*c*, 8*b*, and 11*b* (with 180 degrees off in phase). The output voltage Vs output from the secondary converter 200 and the output voltage Vt output from the tertiary converter 300 has the same value.

3. Second Control

The operation of the second control is described with reference to the circuit configuration of the primary side and the secondary side serving as a minimum unit of power transfer, namely, the circuit configuration of FIG. 1 without the tertiary side, and the discussion is then extended to the circuit configuration of the primary to tertiary side, namely, the circuit configuration of FIG. 1.

3.1 Second Control in Circuit Configuration of Primary and Secondary Sides

Figure 7:
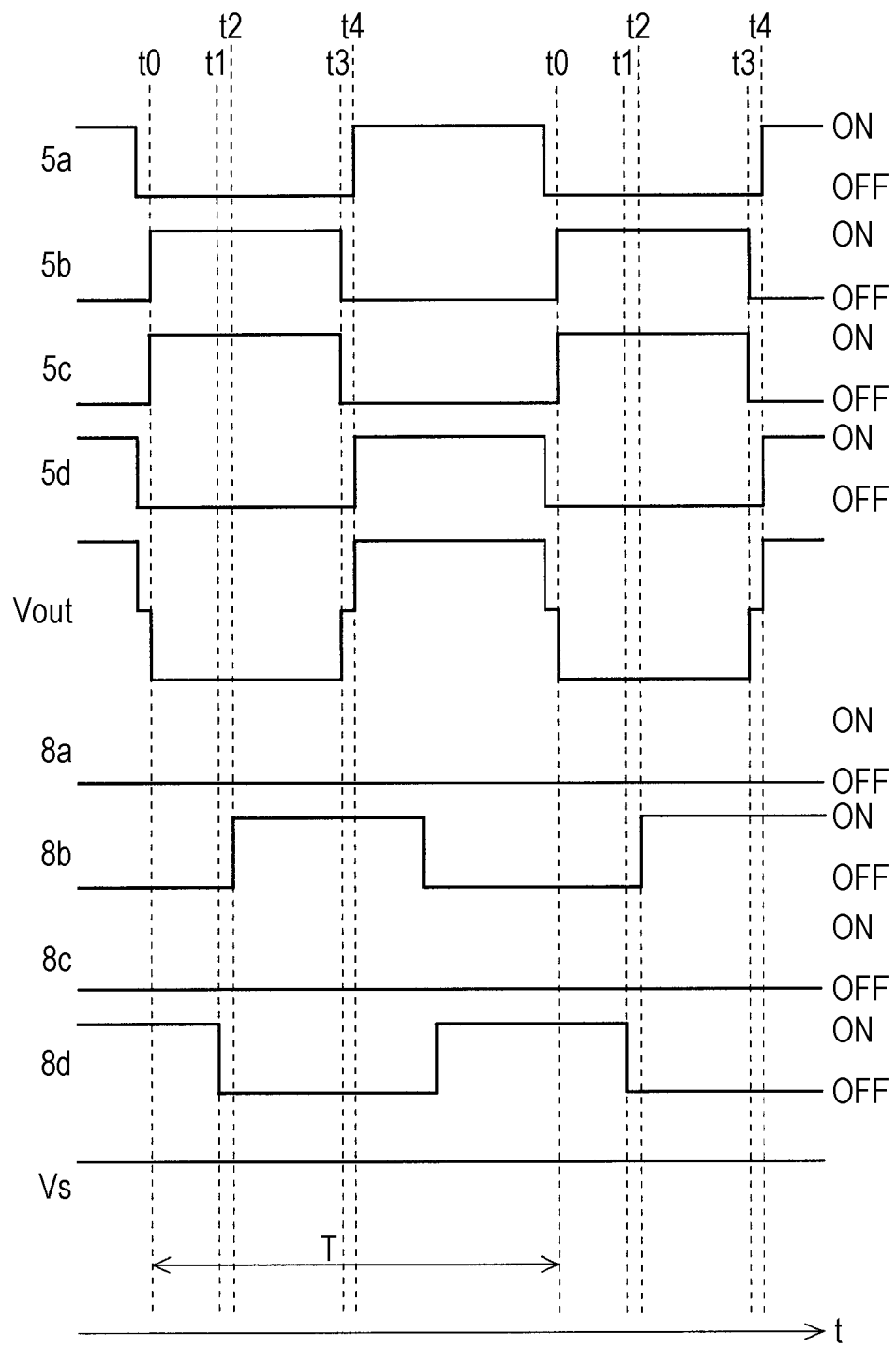
FIG. 7 is a timing diagram of second control illustrating the states of the IGBTs and the output waveforms of the primary and secondary converters.

FIG. 7 is a timing diagram of the second control illustrating states of the IGBTs and the waveform of the output voltage of Vout of the primary converter 100, and the waveform of the output voltage of Vs of the secondary converter 200. IGBTs 5*b* and 5*c*, and IGBTs 5*a* and 5*d* are turned on and off in a complementary fashion except during dead time. The on duty of the IGBTs 5*a* through 5*d* is 50% except during the dead time. The IGBT 8*b* is switched in phase off the IGBTs 5*b* and 5*c*, and the IGBT 8*d* is switched in phase off the IGBTs 5*a* and 5*d*. The on duty of the IGBTs 8*b* and 8*d* is also 50% except during the dead time. In the second control, the output power from the secondary converter 200 is adjusted by varying in phase the amounts of shift described above.

Figure 8:
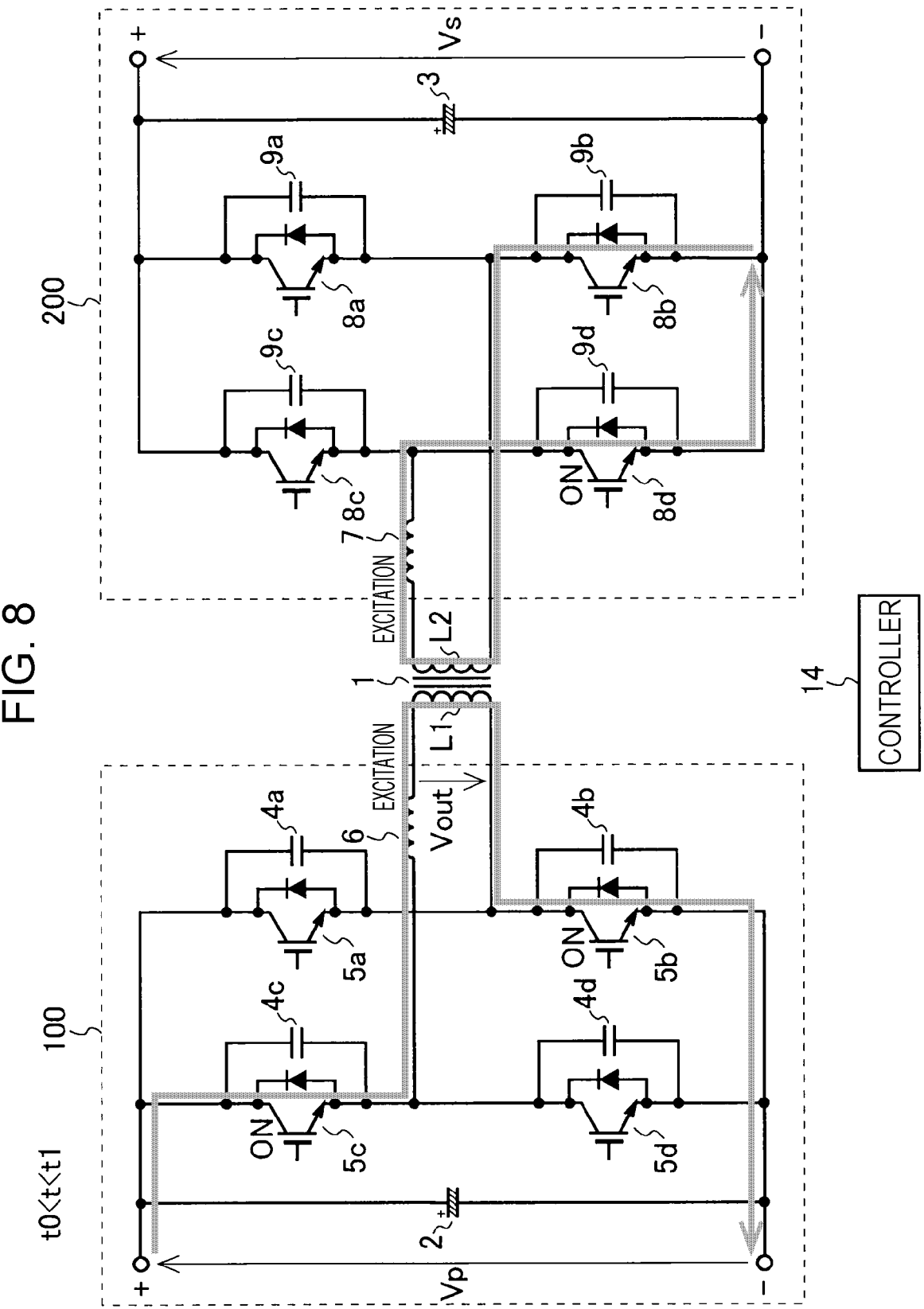
FIG. 8 illustrates an operation of the DC-DC converter in the second control.

Since IGBTs 5*b* and 5*c* are in an on state at time t within a time duration of t0<t<t1 as illustrated in FIG. 7, a current flows through the IGBT 5*c*, the reactor 6, the primary winding L1 and the IGBT 5*b* in that order in the primary converter 100 as illustrated in FIG. 8. In this way, an electromotive force occurs in the secondary winding L2 of the transformer 1, and the IGBT 8*d* is turned on as illustrated in FIG. 7. A current flows through the IGBT 8*b*, the secondary winding L2 of the transformer 1, the reactor 7, and the IGBT 8*d* in that order in the secondary converter 200 as illustrated in FIG. 8.

Figure 9:
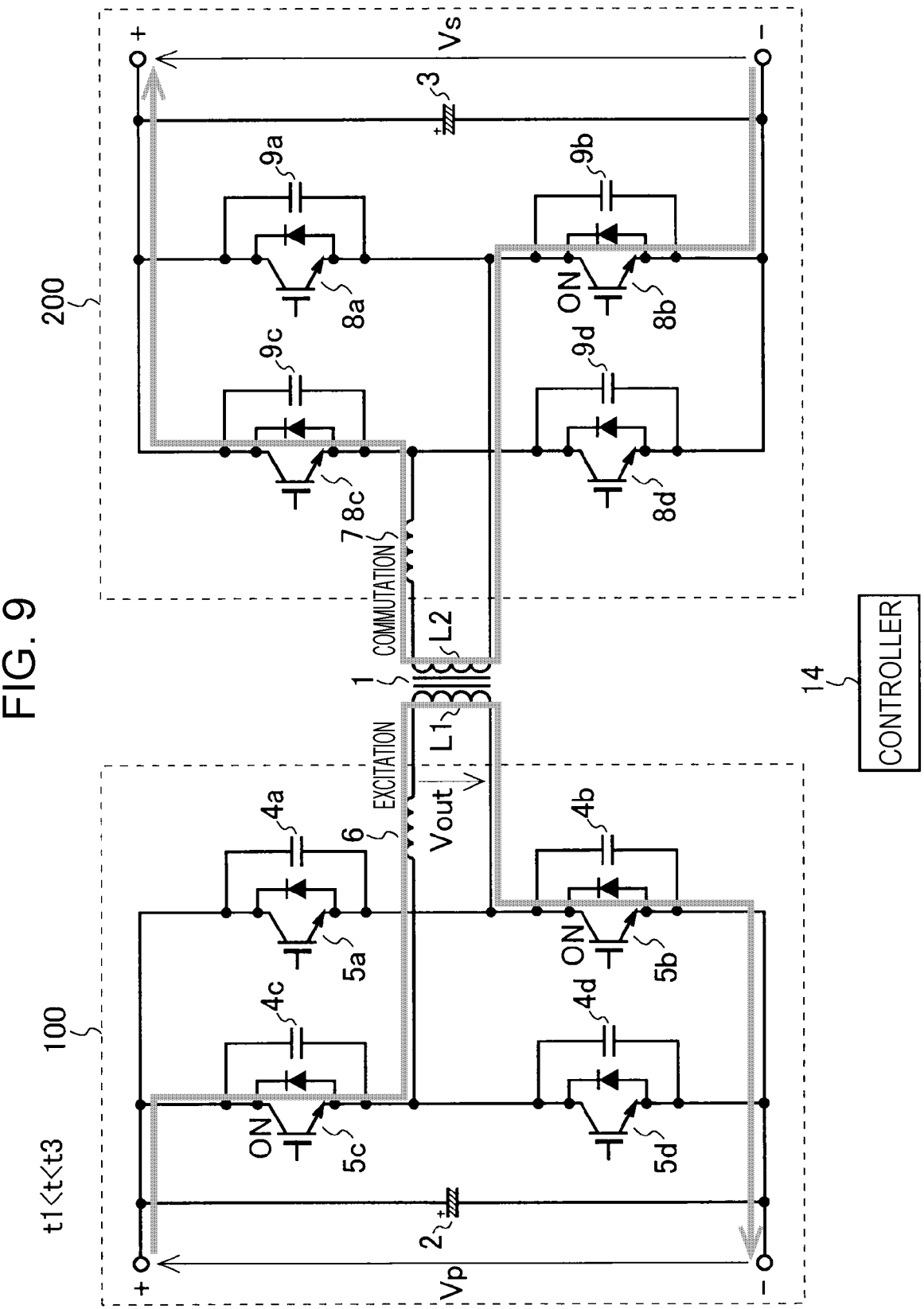
FIG. 9 illustrates the operation of the DC-DC converter in the second control.

Within a time duration t of t1<t<t3, the IGBT 8*d* is turned off at the timing t=t1, and later the IGBT 8*b* is turned on at the timing t=t2. A current thus flows through the IGBT 8*b*, the secondary winding L2 of the transformer 1, the reactor 7, and the IGBT 8*c* in that order in the secondary converter 200 as illustrated in FIG. 9. An electromotive force excited by a current flowing through the primary converter 100 appears in the secondary winding L2 of the transformer 1, and an electromotive force during commutation in the reactor 7 is added. In this way, the output voltage of Vs of the secondary converter 200 rises.

Figure 10:
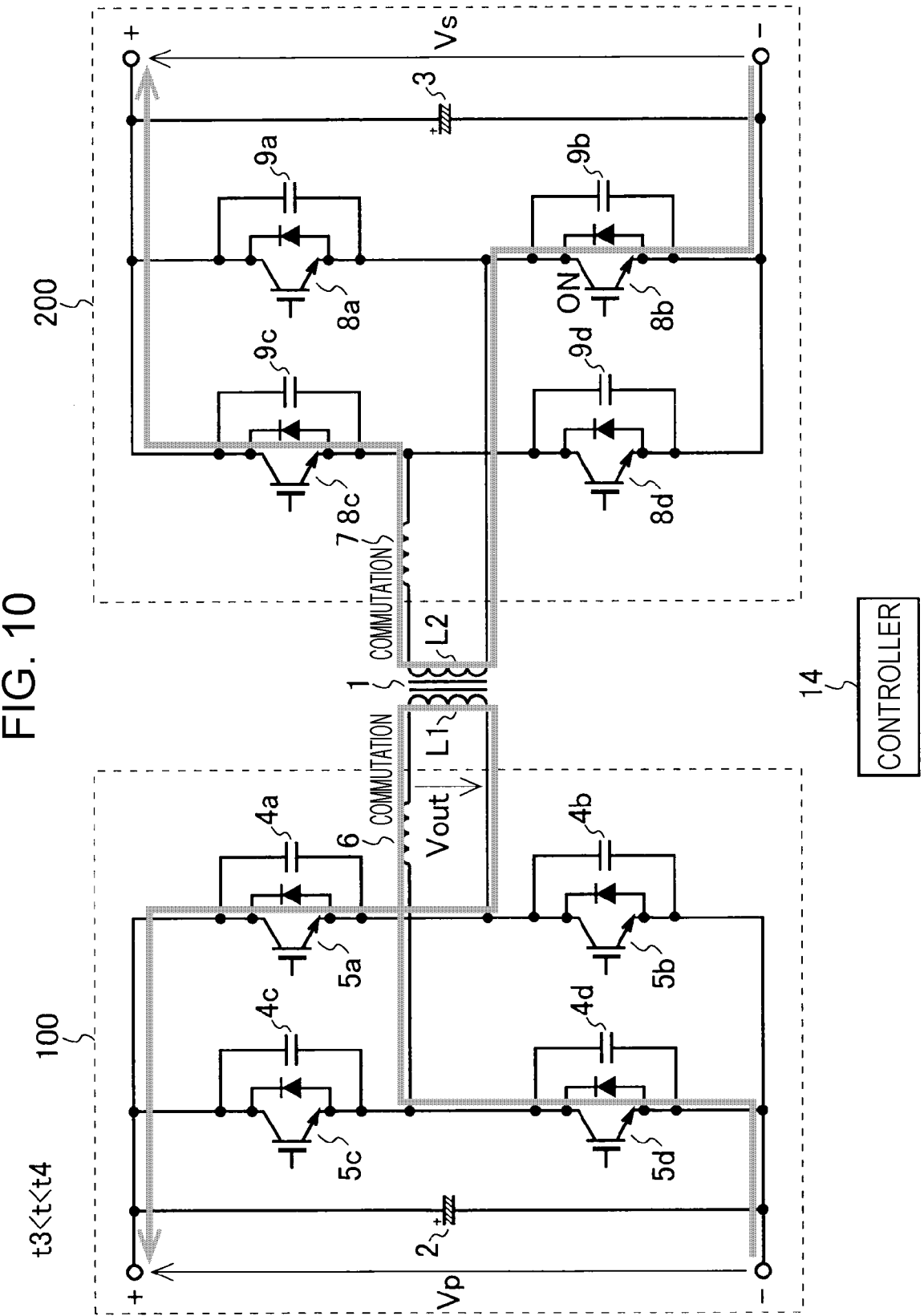
FIG. 10 illustrates the operation of the DC-DC converter in the second control.

Within a time duration t of t3<t<t4, all the IGBTs 5*a* through 5*d* and 8*a*, 8*c*, and 8*d* are turned off, and the reactor 6 commutates the current as illustrated in FIG. 7. A current thus flows through the IGBT 5*d*, the reactor 6, the primary winding L1 of the transformer 1, and the IGBT 5*a* in that order in the primary converter 100 as illustrated in FIG. 10. The commutation in the reactor 7 causes the current to continuously flow through the output terminals of the secondary converter 200 in the secondary converter 200.

Within a time duration t of t4<t, the symmetrical structure of the full bridge causes the operation of the primary converter 100 and the secondary converter 200 at time t within the time duration of t4<t to be identical to the operation of the primary converter 100 and the secondary converter 200 at time t within a range of t0<t<t4 though a different combination of IGBTs is turned on. The discussion about that operation is not repeated.

In the first control, the on duty may be increased to increase the output power of the secondary converter 200. If the on duty reaches 50% except during the dead time, it is difficult to increase the output power of the secondary converter 200 any longer. However, switching from the first control to the second control allows the secondary converter 200 to seamlessly output power higher than maximum output power of the secondary converter 200 in the first control.

When the on duty of the switching control performed in the first control reaches about 50%, the controller 14 may directly switch from the first control to the second control. The first control is intended to reduce a switching loss related to a failure in zero voltage switching (ZVS). If the second control has a more efficient region even with a light load than the first control, the controller 14 may directly switch from the first control to the second control before the on duty of each switching control operation performed in the first control reaches about 50%.

3.2 Second Control in Circuit Configuration of FIG. 1

In the circuit configuration described below, the controller 14 sets the primary converter 100 to be an input converter, and sets the secondary converter 200 and the tertiary converter 300 to be output converters, and connects a load to the secondary side only. More specifically, power is output to the load from the secondary side, and no power is output from the tertiary side.

Figure 11:
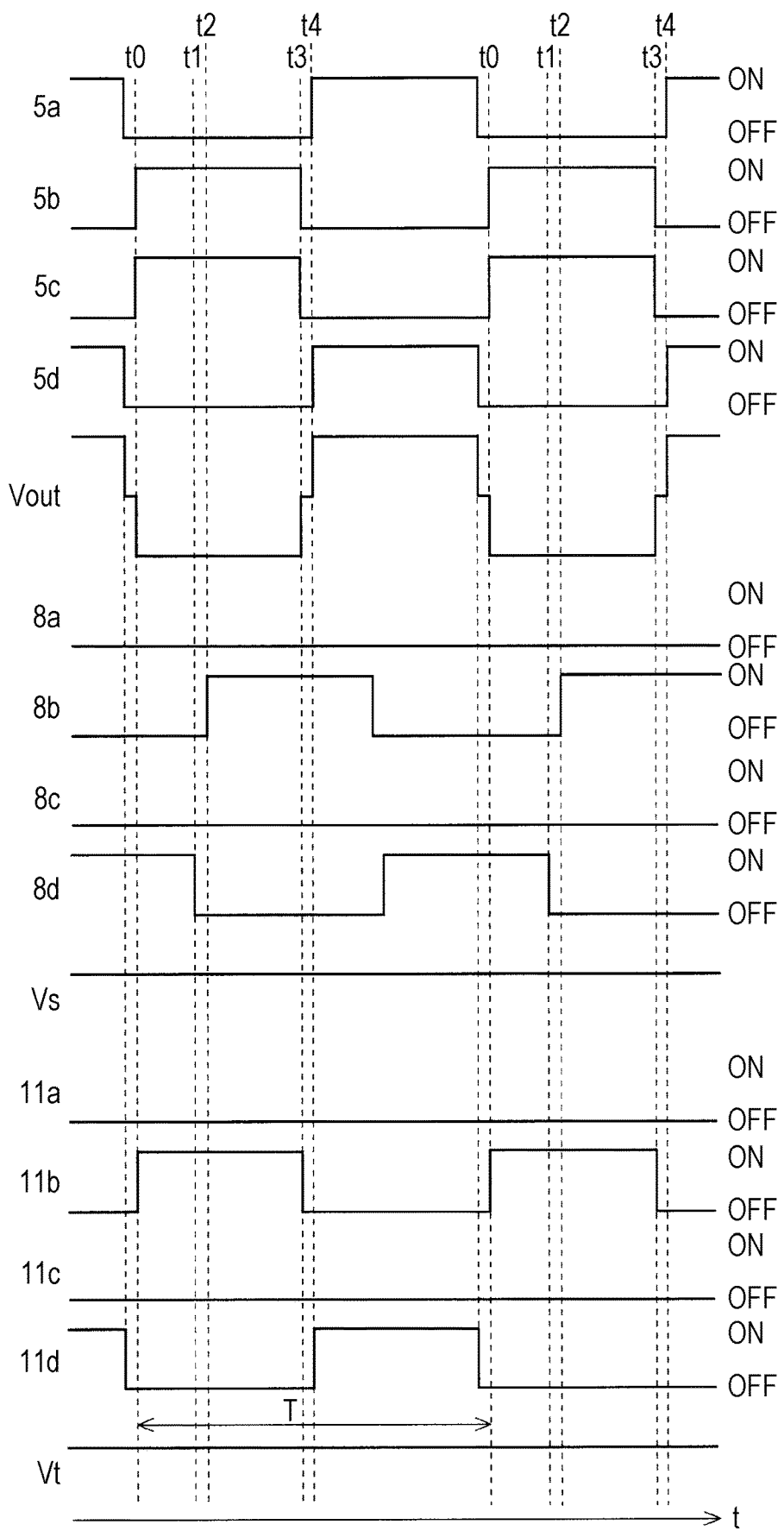
FIG. 11 is a timing diagram of the second control illustrating the states of the IGBTs and the output waveforms of the primary to tertiary converters.

FIG. 11 illustrates, with the second control performed, the states of the IGBTs, the waveform of the output voltage Vout of the primary converter 100, the waveform of the output voltage Vs of the secondary converter 200, and the waveform of the output voltage Vt of the tertiary converter 300.

IGBTs 5*b* and 5*c* and IGBTs 5*a* and 5*d* are turned on and off a complementary fashion except during the dead time. The on duty of the IGBTs 5*a* through 5*d* is 50% except during the dead time.

The IGBT 8*b* is switched in phase off the IGBTs 5*b* and 5*c*, and the IGBT 8*d* is switched in phase off the IGBTs 5*a* and 5*d*. The on duty of the IGBTs 8*b* and 8*d* is 50% except during the dead time. In the second control, the output power from the secondary converter 200 is adjusted by varying the amounts of phase shift.

The output power from the tertiary converter 300 may be adjusted by varying the amount of phase shift through a control operation in the tertiary side similar to the control operation in the secondary side. Since the tertiary side gives no output in this example, the amount of phase shift in the tertiary side is set to be zero as illustrated in FIG. 11.

4. Circulating Current

In the DC-DC converter of one embodiment of the disclosure, the operation of the input converter is clearly different from the operation of the output converter regardless of whether the first control or the second control is performed. A converter that is in an unfixed state, namely, a converter working as an input converter and an output converter a the same time is not present.

Figure 12:
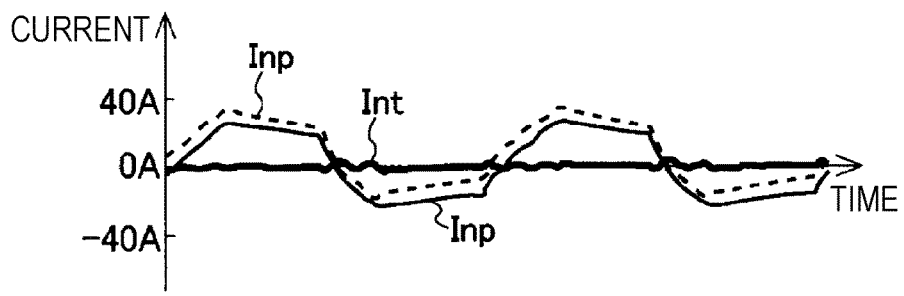
FIG. 12 is a timing diagram illustrating current waveforms in windings in the DC-DC converter of the embodiment of the disclosure.

If the primary converter 100 is set to be an input converter, the secondary converter 200 and the tertiary converter 300 are set to be output converters, and the load is connected to only the secondary side, a current Inp flowing through a primary winding of an insulation transformer, a current ins flowing through a secondary winding of the insulation transformer, and a current (circulating current) Int flowing through a tertiary winding of the insulation transformer result as illustrated in FIG. 12. Referring to FIG. 12, the DC-DC converter of the embodiment of the disclosure restricts the amplitude of the circulating current Int to several amperes (A) with no power transferred from the primary side to the tertiary side, thereby reducing the power loss.

5. Voltage Condition in Constant Current Control

If the primary converter 100 is set to be an input converter, the secondary converter 200 and the tertiary converter 300 are set to be output converters, and the secondary converter 200 and the tertiary converter 300 are respectively connected to and feed power to loads (such as a battery or a light-emitting diode (LED)) in constant current control, the winding ratio of the transformer 1 is desirably set as described below. The winding ratio of the primary side to the secondary side is set to be a ratio that causes the output of the secondary converter 200 to be less than a threshold voltage at which a current starts flowing through the load of the secondary side in the first control, and the winding ratio of the primary side to the tertiary side is set to be a ratio that causes the output of the tertiary converter 300 to be less than a threshold voltage at which a current starts flowing through the load of the tertiary side in the first control.

In the circuit configuration described above, the primary converter 100, the secondary converter 200, and the tertiary converter 300 are independently controllable if power is fed to the load connected to the secondary converter 200 in the constant current control.

Figure 13:
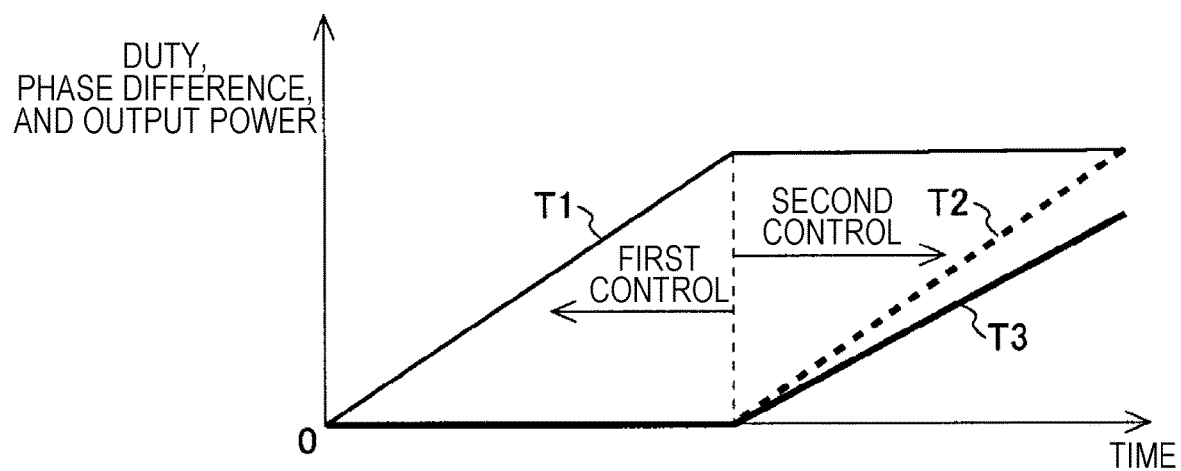
FIG. 13 is a timing diagram illustrating secondary output power in constant current control.

For example, the primary full bridge circuit through the tertiary full bridge circuit may be started up from a switching suspended state, and a control sequence may be performed such that power is output from the secondary side but no power is output from the tertiary side. In such a case, a duty T1 of the primary side and the secondary side, a switching phase difference T2 between the primary side and the secondary side, and output power T3 of the secondary result as illustrated in FIG. 13. A duty T4 of the primary side and the to tertiary side, a switching phase difference T5 between the primary side and the tertiary side, and output power T6 of tertiary side result as illustrated in FIG. 14.

Figure 14:
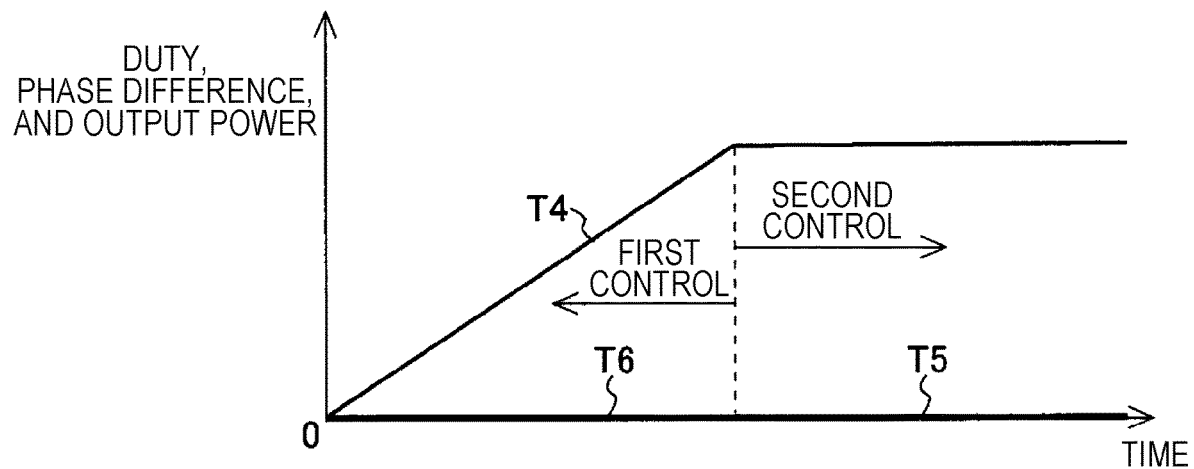
FIG. 14 is a timing diagram illustrating tertiary output power in the constant current control.

Referring to FIG. 13 and FIG. 14, none of the secondary side and the tertiary side output power, and power is output as intended from the secondary side only after the control sequence is shifted to the second control.

Figure 15:
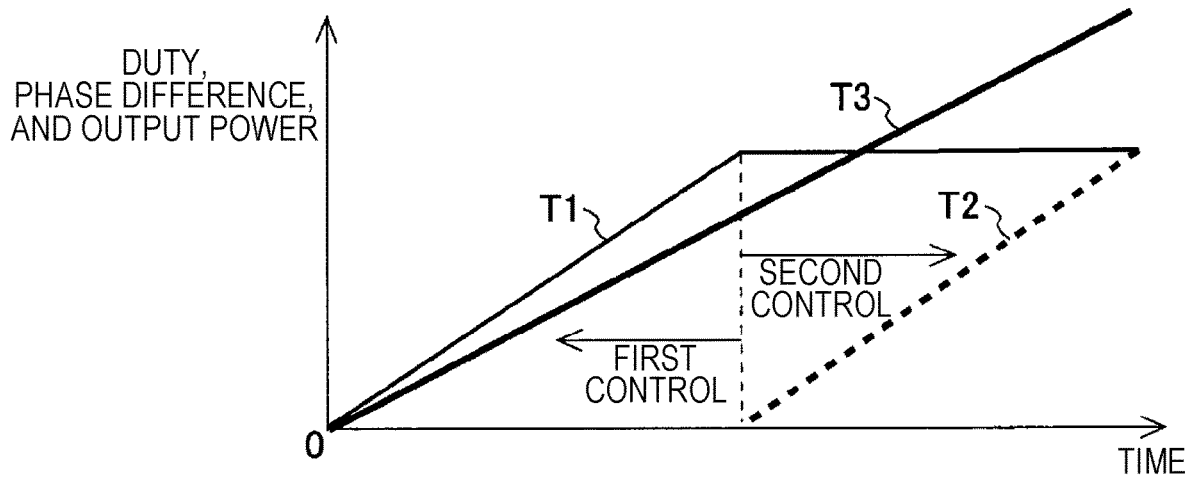
FIG. 15 is a timing diagram illustrating the secondary output power in the constant current control.
Figure 16:
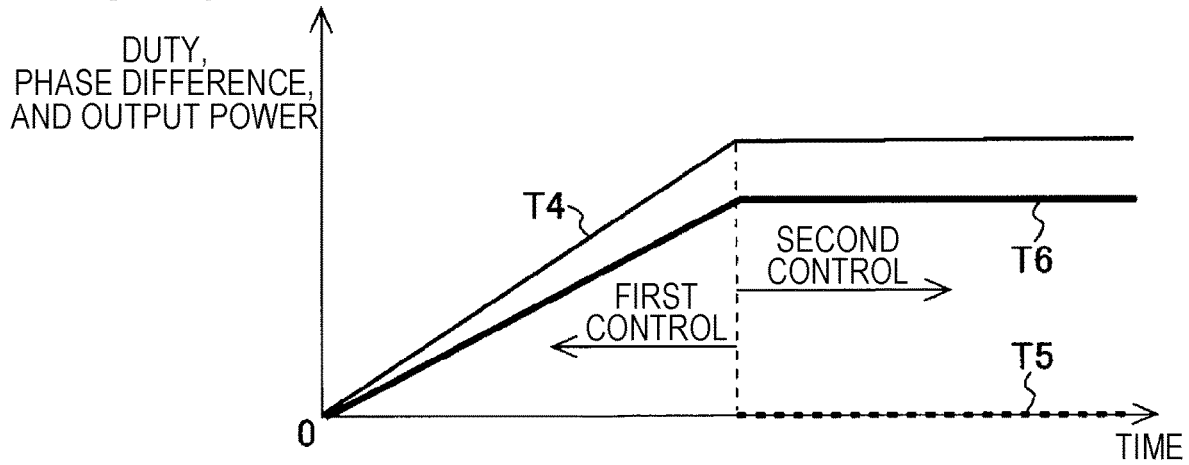
FIG. 16 is a timing diagram illustrating the tertiary output power in the constant current control.

If the control sequence is performed when the voltage output from the secondary converter 200 serving as an output converter in the first control is less than the threshold voltage at which a current starts flowing through the load, the duty T1 of the primary side and the secondary side, the switching phase difference T2 between the primary side and the secondary side, and the output power T3 of the secondary side result as illustrated in FIG. 15, and the duty T4 of the primary side and the tertiary side, the switching phase difference T5 between the primary side and the tertiary side, and the output power of the tertiary side T6 result as illustrated in FIG. 16. Power is output from the tertiary side in the first control and output results are not obtained as intended.

6. Voltage Condition in Constant Voltage Control

If the primary converter 100 is set to be an input converter, the secondary converter 200 and the tertiary converter 300 are set to be output converters, and the secondary converter 200 and the tertiary converter 300 are respectively connected to and feed power to loads in constant voltage control, the winding ratio of the transformer 1 is desirably set as described below. The winding ratio of the primary side to the secondary side is set to be a ratio that causes the output of the secondary converter 200 to be equal to or less than a maximum value of a permissible voltage range of the load of the secondary side in the first control, and the winding ratio of the primary side to the tertiary side is set to be a ratio that causes the output of the tertiary converter 300 to equal to or less than a maximum value of a permissible voltage range of the load of the tertiary side in the first control.

In the circuit configuration described above, the primary converter 100, the secondary converter 200, and the tertiary converter 300 are independently controllable if power is fed to the load connected to the secondary converter 200 in the constant voltage control.

Figure 17:
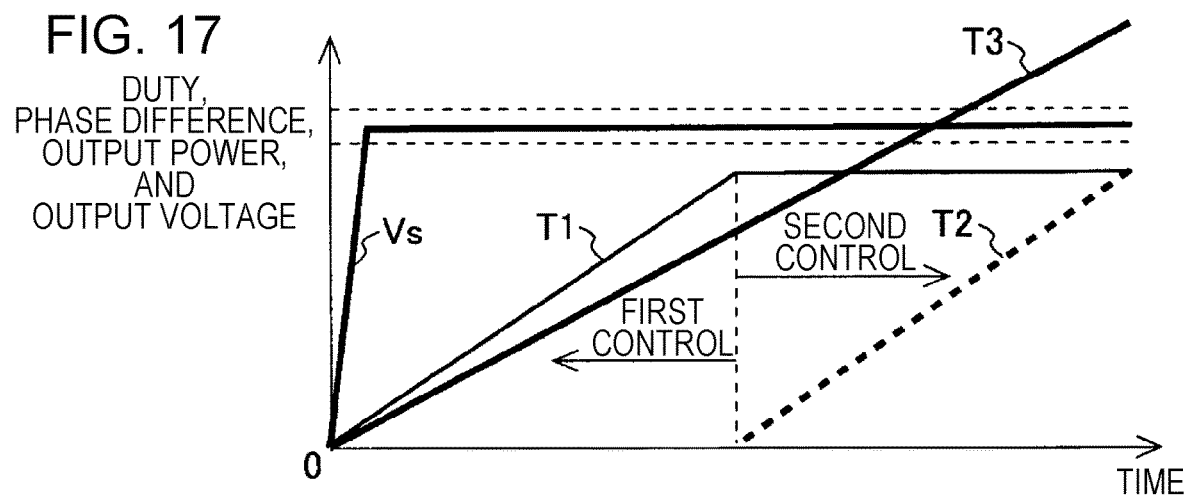
FIG. 17 is a timing diagram illustrating the secondary output power in constant voltage control.
Figure 21:
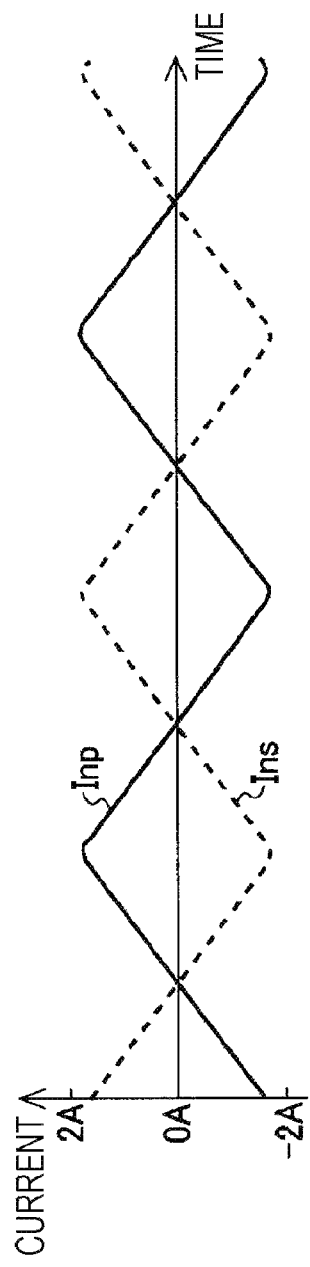
FIG. 21 is a timing diagram illustrating current waveforms along windings of the DAB DC-DC converter disclosed in Hirachi Laboratory Technical Memorandum No. 20140310.
Figure 22:
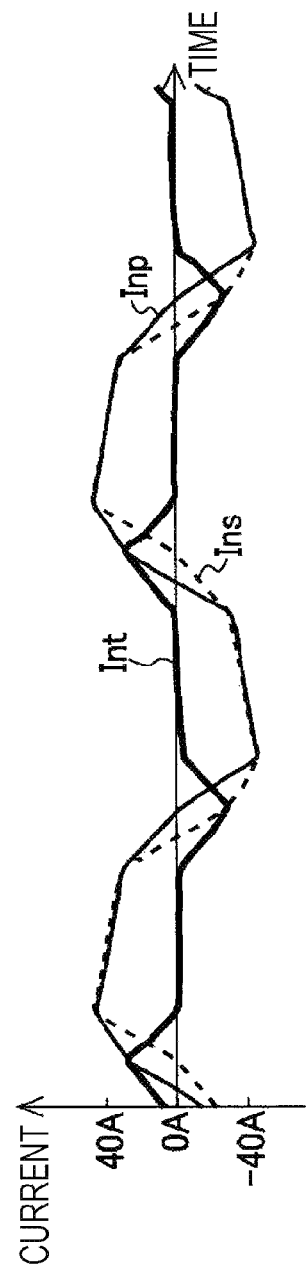
FIG. 22 is a timing diagram illustrating winding current waveforms of a tree-directional DC-DC converter.
Figure 23:
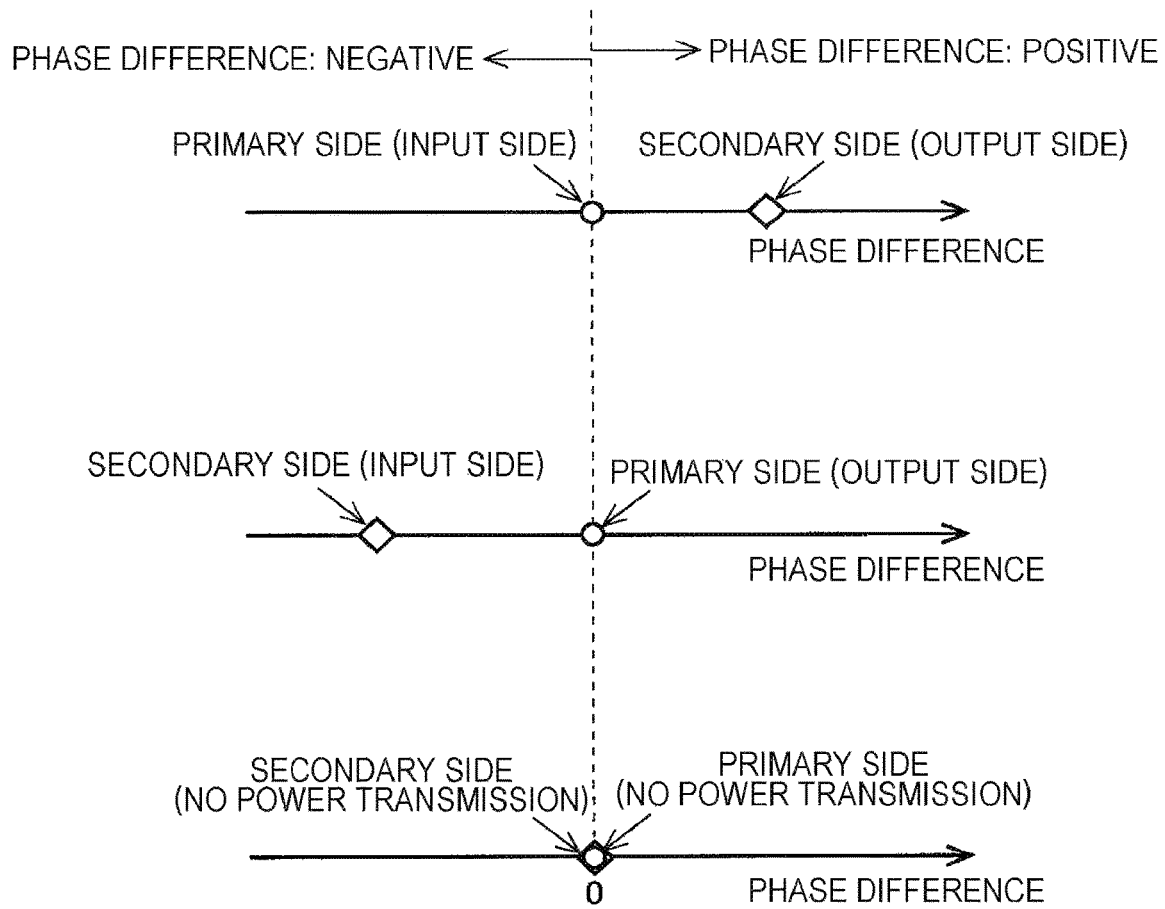
FIG. 23 illustrates a switching phase difference of the DAB DC-DC converter disclosed in Hirachi Laboratory Technical Memorandum No. 20140310.
Figure 24:
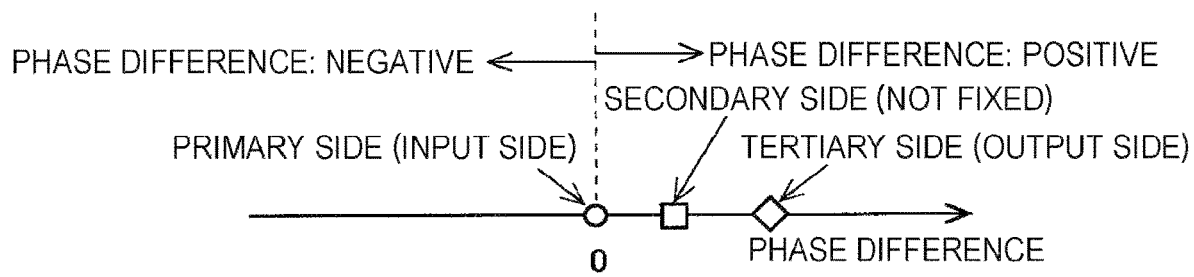
FIG. 24 illustrates an example of the switching phase difference of the three-directional DC-DC converter.

For example, the primary full bridge circuit through the tertiary full bridge circuit may be started up from a switching suspended state, and a control sequence may be performed such that power is output from the secondary side but no power is output from the tertiary side. In such a case, the duty T1 of the primary side and the secondary side, the switching phase difference T2 between the primary side and the secondary side, the output power T3 of the secondary side, and the output voltage Vs of the secondary side result as illustrated in FIG. 17. The duty T4 of the primary side and the tertiary side, the switching phase difference T5 between the primary side and the tertiary side, the output power T6 of the tertiary side, and the output voltage Vt of the tertiary side result as illustrated in FIG. 18. Referring to FIG. 17, a region between parallel lines horizontal with the horizontal axis is a permissible range of the output voltage of the secondary side, and referring to FIG. 18, a region between parallel lines horizontal with the horizontal axis is a permissible range of the output voltage of the tertiary side.

Referring to FIG. 17 and FIG. 18, none of the output voltages of the secondary and tertiary sides exceed a maximum value of the permissible range.

As an example, the winding ratio of the primary side to the second side is set to be a ratio that causes the output of the secondary converter 200 to be equal to or less than the maximum value of the permissible voltage range of the load of the secondary side in the first control, and the winding ratio of the primary side to the tertiary side is set to be a ratio that causes the output of the tertiary converter 300 to be equal to or more than the maximum value of the permissible voltage range of the load of the tertiary side in the first control. If the control sequence is performed in the above setting, the duty T1 of the primary side and the secondary side, the switching phase difference T2 between the primary side and the secondary side, the output power T3 of the secondary side, and the output voltage Vs of the secondary side result as illustrated in FIG. 19. The duty T4 of the primary side and the tertiary side, the switching phase difference T5 between the primary side and the tertiary side, the output power T6 of the tertiary side, and the output voltage Vt of the tertiary side result as illustrated in FIG. 20. Referring to FIG. 19, a region between parallel lines horizontal with the horizontal axis is a permissible range of the output voltage of the secondary side, and referring to FIG. 20, a region between parallel lines horizontal with the horizontal axis is a permissible range of the output voltage of the tertiary side.

As illustrated in FIG. 19 and FIG. 20, the output voltage Vt of the tertiary side exceeds the maximum value of the permissible range even in the first control.

Referring to FIG. 17 through FIG. 20, the output voltage is naturally less than the minimum value of the permissible range in a region of a smaller duty in the first control because of the characteristics of the DC-DC converter of the embodiment of the disclosure. In a steady-state, the output voltage is set to be not less than the minimum value of the permissible range. A state that the output voltage and the output power are zero may be caused using a region where the output voltage is less than the minimum value of the permissible range at the startup and suspension time of the DC-DC converter of the embodiment of the disclosure.

7. Conclusion

The embodiment of the disclosure has been described. The disclosure is not limited to the embodiment. A variety of modifications may be added to the embodiment without departing from the scope of the disclosure.

IGBTs $8a$, $8c$, $11a$, and $11c$ are fixed to be in an off state in the first control and the second control. IGBTs $8b$, $8d$, $11b$, and $11d$ may be fixed to be in an off state in place of IGBTs $8a$, $8c$, $11a$, and $11c$.

Another type of transistor, such as metal-oxide-semiconductor field-effect transistor (MOSFET), may be used in place of IGBT.

In the first control, the IGBTs $5a$ and $5d$ are switched with half the period in phase off the IGBTs $5b$ and $5c$ (with a phase of 180 degrees off). As long as the IGBTs $5a$ and $5d$ are not turned on at the same timing, and the IGBTs $5b$ and $5c$ are not turned on at the same timing, any amount of phase shift is acceptable. The amount of phase shift may not be necessarily fixed, but may be dynamically controlled by the controller 14.

In the embodiment described above, the DC-DC converter performs both the first control and the second control. However, a DC-DC converter that is able to perform the first control but unable to perform the second control may also be acceptable.

In the embodiment described above, the DC-DC converter includes the primary converter through the tertiary converter. The DC-DC converter may be extended to a DC-DC converter that includes the primary converter to the N-th order converter (N is a natural number equal to 3 or more). In the embodiment described above, the primary full bridge circuit is set to be an input converter, and the second control and the three-directional DC-DC converter are set to be output converters. In the extended DC-DC converter, each of the primary converter to N-th order converter may be set to be either an input converter or an output converter.

In the embodiment described above, the DC-DC converter may perform both the first control and the second control. A DC-DC converter that is able to perform the first control but unable to perform the second control may be also acceptable.

The DC-DC described above is configured as described below (first configuration). The DC-DC converter includes the k-th order converters (100, 200, and 300) including the reactors (6, 7, and 10), multiple semiconductor switching elements ($5a$ through $5d$, $8a$ through $8d$, and $11a$ through $11d$), and multiple capacitors ($4a$ through $4d$, $9a$ through $9d$, and $12a$ through 13) respectively connected in parallel with the semiconductor switching elements (k is a natural number equal to or below N and N is a natural number equal to or below 3), the transformer 1 having a primary winding through an N-th order winding (L1, L2, and L3) and the controller (14) that controls switching of the primary converter through the N-th order converter. The reactor of the k-th order converter is the reactor connected to the k-th order winding and/or a leakage inductance of the k-th order winding. Each of the primary converter through the N-th order converter includes the full bridge circuit. When the controller performs the first control with each of the primary converter through the N-th order converter set to be an input converter or an output converter, the controller controls a switching operation such that the semiconductor switching element located in an upper side of a first arm of the input converter matches the semiconductor switching element located in an lower side of a second arm of the input converter in terms of an on period, controls a switching operation such that the semiconductor switching element located in a lower side of the first arm of the input converter matches the semiconductor switching element located in an upper side of the second arm of the input converter in terms of the on period, does not control a switching operation on two semiconductor switching elements located in the upper sides or the lower sides of the first arm and the second arm of the output converter, controls a switching operation with a phase difference of about 180 degrees on other two secondary semiconductor switching elements on a secondary side located in the upper sides or the lower sides of the first arm and the second arm of the output converter, controls a switching operation such that one of the other two secondary semiconductor switching elements on the secondary side located in the upper sides or the lower sides of the first arm and the second arm matches each of the semiconductor switching element located in the upper side of the first arm of the input converter and the semiconductor switching element located in the lower side of the second arm of the input converter in terms of the on period, and adjusts output power of the output converter by varying the on-duty of each of the switching operations.

In the configuration described above, the DC-DC converter, including the primary converter through the N-th order converter, may reduce the power loss caused by the circulating current.

The DC-DC converter of the first configuration may be re-configured as described below (second configuration). In the DC-DC converter, the controller may perform the first control if all the output converters are adjustable in output power through the first control, and may perform second control on an output converter if the controller becomes unable to adjust the output converter in output power through the first control. When the controller performs the second control, the controller controls the switching operation such that the semiconductor switching element located in the upper side of the first arm of the input converter matches the semiconductor switching element located in the lower side of the second arm of the input converter in terms of the on period, controls the switching operation such that the semiconductor switching element located in the lower side of the first arm of the input converter matches the semiconductor switching element located in the upper side of the second arm of the input converter in terms of the on period, does not control the switching operation on the two semiconductor switching elements located in the upper sides or the lower sides of the first arm and the second arm of the output converter, controls the switching operation with a phase difference of about 180 degrees on the other two secondary semiconductor switching elements located in the upper sides and the lower sides of the first arm and the second arm of the output converter, controls the switching operation such that one of the other two secondary semiconductor switching elements located in the upper sides or the lower sides of the first arm and the second arm shifts in phase in terms of the on period from each of the semiconductor switching element located in the upper side of the first arm of the input converter and the semiconductor switching element located in the lower side of the second arm of the input converter, and adjusts output power of the output converter by varying the on duty of each of the switching operations.

In the second configuration described above, the output converter may output power higher than maximum output power of the output converter in the first control.

The DC-DC converter of the second configuration may be reconfigured as described below (third configuration). In the DC-DC converter, the controller directly may switch from the first control to the second in a manner such that the controller performs the first control if all the output converters are adjustable in output power through the first control, and performs second control on an output converter if the controller becomes unable to adjust the output converter in output power through the first control. If all the output converters become adjustable in output power through the first control when the second control is performed on one of the output converters after becoming unadjustable in output power through the first control, the controller directly switches from the second control to the first control to perform the first control on the one of the output converters that is controlled in the second control earlier.

In the third configuration described above, the direction of power transfer is seamlessly switched with the switching loss related to a failure in ZVS kept to a minimum.

The DC-DC converter of one of the first through third configurations may be re-configured as described below (fourth configuration). In the DC-DC converter, if a load connected to an m-th order converter (m is a number within a range of 1 through N) is powered in constant voltage control, the m-th order converter is the output converter, and a voltage output from the m-th order converter in the first control is equal to or below a maximum value of a permissible voltage range of the load.

In the fourth configuration described above, if power is fed to the load connected to the m-th order converter in the constant voltage control, the primary converter through the N-th order converter may be independently controlled.

The DC-DC converter of one of the first through fourth configurations may be re-configured as described below (fifth configuration). In the DC-DC converter, if a load connected to an m-th order converter (m is a number within a range of 1 through N) is powered in constant current control, the m-th order converter is the output converter, and a voltage output from the m-th order converter in the first control is below a threshold voltage at which a current starts flowing through the load.

In the fifth configuration described above, if power is fed to the load connected to the m-th order converter in the constant voltage control, the primary converter through the N-th order converter may be independently controlled.

The present disclosure contains subject matter related to that disclosed in Japanese Priority Patent Application. JP 2017-239801 filed in the Japan Patent Office on Dec. 14, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A direct current to direct current (DC-DC) converter comprising:
    a primary converter through a k-th order converter, each converter including a reactor, a plurality of semiconductor switching elements, and a plurality of capacitors respectively connected in parallel with the semiconductor switching elements (k is a natural number equal to or below N and N is a natural number equal to or above 3);
    a transformer having a primary winding through an N-th order winding; and
    a controller that controls switching of the primary converter through an N-th order converter,
    wherein the reactor of the k-th order converter is the reactor connected to the k-th order winding and/or the reactor of the k-th order converter is a leakage inductance of the k-th order winding,
    wherein each of the primary converter through the N-th order converter includes a full bridge circuit,
    wherein when the controller performs a first control with each of the primary converter through the N-th order converter set to be an input converter or an output converter,
    the controller performs a switching operation such that the semiconductor switching element located in an upper side of a first arm of the input converter matches the semiconductor switching element located in a lower side of a second arm of the input converter in terms of an on period,
    performs a switching operation such that the semiconductor switching element located in a lower side of the first arm of the input converter matches the semiconductor switching element located in an upper side of the second arm of the input converter in terms of the on period,
    does not perform a switching operation on two semiconductor switching elements located in the upper sides or the lower sides of the first arm and the second arm of the output converter,
    performs a switching operation with a phase difference of about 180 degrees on other two secondary semiconductor switching elements on a secondary side located in the upper sides or the lower sides of the first arm and the second arm of the output converter,
    performs a switching operation such that one of the other two secondary semiconductor switching elements on the secondary side located in the upper sides or the lower sides of the first arm and the second arm matches each of the semiconductor switching element located in the upper side of the first arm of the input converter and the semiconductor switching element located in the lower side of the second arm of the input converter in terms of the on period, and
    adjusts output power of the output converter by varying an on-duty of each of the switching operations to reduce power loss.

2. The DC-DC converter according to claim 1, wherein the controller performs the first control if output powers of all the output converters are adjustable through the first control, and performs a second control on an output converter if the controller becomes unable to adjust output power of the output converter through the first control, wherein when the controller performs the second control,
the controller performs a switching operation such that the semiconductor switching element located in the upper side of the first arm of the input converter matches the semiconductor switching element located in the lower side of the second arm of the input converter in terms of the on period,
performs a switching operation such that the semiconductor switching element located in the lower side of the first arm of the input converter matches the semiconductor switching element located in the upper side of the second arm of the input converter in terms of the on period,
does not perform a switching operation on the two semiconductor switching elements located in the upper sides or the lower sides of the first arm and the second arm of the output converter,
performs a switching operation with a phase difference of about 180 degrees on the other two secondary semiconductor switching elements on the secondary side located in the upper sides or the lower sides of the first arm and the second arm of the output converter,
performs a switching operation such that one of the other two secondary semiconductor switching elements on the secondary side located in the upper sides or the lower ends of the first arm and the second arm shifts in phase in terms of the on period from each of the semiconductor switching element located in the upper side of the first arm of the input converter and the semiconductor switching element located in the lower side of the second arm of the input converter, and
adjusts output power of the output converter by varying the on duty of each of the switching operations to reduce power loss.

3. The DC-DC converter according to claim 2, wherein the controller directly switches from the first control to the second control such that the controller performs the first control if all of the output powers of the output converters are adjustable through the first control, and performs the second control on one of the output converter if the controller becomes unable to adjust output power of the one of the output converters through the first control, and
wherein when the output power of the one of the output converters becomes adjustable again through the first control, the controller directly switches from the second control to the first control to perform the first control on the one of the output converters that was controlled under the second control earlier.

4. The DC-DC converter according to claim 1, wherein if a load connected to an m-th order converter (m is a number within a range of 1 through N) is powered in constant voltage control, the m-th order converter is the output converter, and a voltage output from the N-th order converter in the first control is equal to or below a maximum value of a permissible voltage range of the load.

5. The DC-DC converter according to claim 1, wherein if a load connected to an m-th order converter (m is a number within a range of 1 through N) is powered in constant current control, the m-th order converter is the output converter, and a voltage output from the N-th order converter in the first control is below a threshold voltage at which a current starts flowing through the load.

6. A direct current to direct current (DC-DC) converter comprising:
an input side converter that is a full bridge circuit,
an output side converter that is a full bridge circuit,
each of the input side converter and the output side converter includes a plurality of semiconductor switching elements, a plurality of capacitors respectively connected in parallel with the semiconductor switching elements and a reactor,
a controller that performs one of
a first switching operation such that a semiconductor switching element located in an upper side of a first arm of the output side converter and a semiconductor switching element located in the upper side of a second arm of the output side converter are fixed in an off state, and
a second switching operation such that a semiconductor switching element located in a lower side of the first arm of the output side converter and a semiconductor switching element located in the lower side of the second arm of the output side converter are fixed in the off state, and
adjusts output power of the output side converter by varying an on duty of switching operations of the plurality of semiconductor switching elements other than the two semiconductor switching elements fixed in the off state,
wherein the controller performs a first control operation comprising:
a first switching control for matching on periods of a semiconductor switching element located in an upper side of a first arm of the input side converter, a semiconductor switching element located in a lower side of a second arm of the input side converter, and one of the two semiconductor switching elements of the output side converter, except the two semiconductor switching elements of the output side converter fixed in the off state by the controller, among the plurality of semiconductor switching elements of the output side converter, with each other, and
a second switching control for matching on periods of a semiconductor switching element located in the lower side of the first arm of the input side converter, a semiconductor switching element located in the upper side of the second arm of the input side converter, and the other of the two semiconductor switching elements of the output side converter, except the two semiconductor switching elements of the output side converter fixed in the off state by the controller, among the plurality of semiconductor switching elements of the output side converter, with each other,
a first off control operation for switching the plurality of semiconductor switching elements of the input side converter and the output side converter to the off state,
wherein the controller performs the first switching control and the second switching control with a phase difference of 180 degrees,
wherein when the controller performs the first off control operation, excitation energy stored in a reactor of the input side converter is regenerated across input terminals in the input side converter, and excitation energy stored in a reactor of the output side converter is supplied to output terminals in the output side converter.

7. The DC-DC converter according to claim 6, wherein the controller performs a second control operation comprising:

a third switching control for matching on period of the semiconductor switching element located in the upper side of the first arm of the input side converter and the semiconductor switching element located in the lower side of the second arm of the input side converter with each other, a fourth switching control for matching on periods of the semiconductor switching element located in the lower side of the first arm of the input side converter and the semiconductor switching element located in the upper side of the second arm of the input side converter with each other, a fifth switching control for a switching operation of one of the two semiconductor switching elements of the output side converter, except the two semiconductor switching elements of the output side converter fixed in the off state by the controller, among the plurality of semiconductor switching elements of the output side converter, and a sixth switching control for a switching operation of the other of the two semiconductor switching elements of the output side converter, except the two semiconductor switching elements of the output side converter fixed in the off state by the controller, among the plurality of semiconductor switching elements of the output side converter, wherein the controller changes a phase difference between the third switching control and the fifth switching control, and wherein the controller changes a phase difference between the fourth switching control and the sixth switching control.

8. The DC-DC converter according to claim 7, wherein the controller directly switches from the first control operation to the second control operation such that the controller performs the first control operation if an output power of the output side converter is adjustable through the first control operation, and performs the second control operation on the output side converter if the controller becomes unable to adjust the output power of the output side converter through the first control operation, and wherein when the output power of the output side converter becomes adjustable again through the first control operation, the controller directly switches from the second control operation to the first control operation to perform the first control operation on the output side converter that was controlled under the second control operation earlier.

9. The DC-DC converter according to claim 6, wherein after the controller performs the first off control operation, if the three semiconductor switching elements located in the upper side of the first arm of the input side converter, the lower side of the second arm of the input side converter, and the lower side of the second arm of the output side converter, are turned on, charges stored in capacitors connected, respectively, in parallel with the three semiconductor switching elements are consumed via short-circuiting.

10. The DC-DC converter according to claim 6, wherein a load connected to the output side converter is powered in constant voltage control, and a voltage output from the output side converter in the first control operation is equal to or below a maximum value of a permissible voltage range of the load.

11. The DC-DC converter according to claim 6, wherein a load connected to the output side converter is powered in constant current control, and a voltage output from the output side converter in the first control operation is below a threshold voltage at which a current starts flowing through the load.

* * * * *